United States Patent
Bono et al.

(10) Patent No.: US 11,677,633 B2
(45) Date of Patent: Jun. 13, 2023

(54) METHODS AND SYSTEMS FOR DISTRIBUTING TOPOLOGY INFORMATION TO CLIENT NODES

(71) Applicant: EMC IP Holding Company LLC, Hopkinton, MA (US)

(72) Inventors: Jean-Pierre Bono, Westboro, MA (US); Wing Kin Au, Norwood, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 24 days.

(21) Appl. No.: 17/512,191

(22) Filed: Oct. 27, 2021

(65) Prior Publication Data

US 2023/0131787 A1   Apr. 27, 2023

(51) Int. Cl.
*G06F 15/177* (2006.01)
*H04L 41/12* (2022.01)
*H04L 41/08* (2022.01)

(52) U.S. Cl.
CPC ............. *H04L 41/12* (2013.01); *H04L 41/08* (2013.01)

(58) Field of Classification Search
CPC ............................... H04L 41/12; H04L 41/08
USPC ......................... 709/220, 221, 223
See application file for complete search history.

(56) References Cited

U.S. PATENT DOCUMENTS

| | | |
|---|---|---|
| 5,394,537 A | 2/1995 | Courts et al. |
| 5,946,686 A | 8/1999 | Schmuck et al. |
| 6,038,570 A | 3/2000 | Hitz et al. |
| 6,067,541 A | 5/2000 | Raju et al. |
| 6,119,208 A | 9/2000 | White et al. |
| 6,138,126 A | 10/2000 | Hitz et al. |
| 6,412,017 B1 | 6/2002 | Straube et al. |
| 6,681,303 B1 | 1/2004 | Watanabe et al. |
| 6,725,392 B1 | 4/2004 | Frey et al. |

(Continued)

FOREIGN PATENT DOCUMENTS

| | | | | |
|---|---|---|---|---|
| JP | 2001027951 A | * | 1/2001 | ........... G06F 15/177 |
| WO | 2016196766 A2 | | 12/2016 | |
| WO | 2017079247 A1 | | 5/2017 | |

OTHER PUBLICATIONS

Metz Joachim, "Hierarchical File System (HFS)" Nov. 4, 2020, Retrieved from the Internet on Dec. 16, 2021 https://github.com/libyal/libfshfs/blob/c52bf4a36bca067510d0672ccce6d449a5a85744/documentation/Hierarchical%20System%20 (HFS).asciidoc.

(Continued)

*Primary Examiner* — Liang A Wang
(74) *Attorney, Agent, or Firm* — Chamberlain, Hrdlicka, White, Williams & Aughtry

(57) ABSTRACT

In general, embodiments relate to a method for distributing topology information to client application nodes in a distributed system, the method comprising: creating a file system on a management node, enabling a plurality of client application nodes to access the file system on the management node, obtaining a topology file, wherein the topology file comprises information about a plurality of storage devices to enable the plurality of client application nodes to issue input/output (IO) requests directly to the plurality of storage devices, and storing, by the management node, the topology file in the file system, wherein the topology file is accessible to the plurality of client application nodes once the topology file is stored in the file system.

17 Claims, 18 Drawing Sheets

(56) References Cited

U.S. PATENT DOCUMENTS

| | | | |
|---|---|---|---|
| 6,751,702 B1* | 6/2004 | Hsieh | H04L 63/102 711/112 |
| 7,191,198 B2 | 3/2007 | Asano et al. | |
| 7,685,126 B2 | 3/2010 | Patel et al. | |
| 8,112,395 B2 | 2/2012 | Patel et al. | |
| 8,117,388 B2 | 2/2012 | Jernigan, IV | |
| 8,312,242 B2 | 11/2012 | Casper et al. | |
| 8,364,999 B1 | 1/2013 | Adessa | |
| 8,370,910 B2 | 2/2013 | Kamei et al. | |
| 8,407,265 B1 | 3/2013 | Scheer et al. | |
| 8,429,360 B1 | 4/2013 | Iyer et al. | |
| 8,510,265 B1* | 8/2013 | Boone | G06F 16/1827 707/790 |
| 8,566,673 B2 | 10/2013 | Kidney et al. | |
| 8,818,951 B1 | 8/2014 | Muntz et al. | |
| 8,924,684 B1 | 12/2014 | Vincent | |
| 9,069,553 B2 | 6/2015 | Zaarur et al. | |
| 9,104,321 B2 | 8/2015 | Cudak et al. | |
| 9,172,640 B2 | 10/2015 | Vincent et al. | |
| 9,250,953 B2 | 2/2016 | Kipp | |
| 9,300,578 B2 | 3/2016 | Chudgar et al. | |
| 9,330,103 B1 | 5/2016 | Bono et al. | |
| 9,443,095 B2 | 9/2016 | Lahteenmaki | |
| 9,483,369 B2 | 11/2016 | Sporel | |
| 9,485,310 B1 | 11/2016 | Bono et al. | |
| 9,760,393 B2 | 9/2017 | Hiltgen et al. | |
| 9,779,015 B1 | 10/2017 | Oikarinen et al. | |
| 9,886,735 B2 | 2/2018 | Soum et al. | |
| 10,031,693 B1 | 7/2018 | Bansode et al. | |
| 10,156,993 B1 | 12/2018 | Armangau et al. | |
| 10,209,899 B2 | 2/2019 | Oshins et al. | |
| 10,248,610 B2 | 4/2019 | Menachem et al. | |
| 10,346,297 B1 | 7/2019 | Wallace | |
| 10,348,813 B2 | 7/2019 | Abali et al. | |
| 10,649,867 B2 | 5/2020 | Roberts et al. | |
| 10,693,962 B1* | 6/2020 | Neumann | H04L 67/53 |
| 11,397,545 B1 | 7/2022 | Hamid et al. | |
| 11,438,231 B2 | 9/2022 | Gardner et al. | |
| 11,481,261 B1 | 10/2022 | Frandzel et al. | |
| 2003/0074486 A1 | 4/2003 | Anastasiadis et al. | |
| 2004/0062245 A1 | 4/2004 | Sharp et al. | |
| 2004/0172073 A1 | 9/2004 | Busch et al. | |
| 2004/0210761 A1 | 10/2004 | Eldar et al. | |
| 2005/0004925 A1 | 1/2005 | Stahl et al. | |
| 2005/0114557 A1 | 5/2005 | Arai et al. | |
| 2005/0172097 A1 | 8/2005 | Voigt et al. | |
| 2006/0020745 A1 | 1/2006 | Conley et al. | |
| 2006/0101081 A1 | 5/2006 | Lin et al. | |
| 2006/0117135 A1 | 6/2006 | Thind et al. | |
| 2006/0200858 A1 | 9/2006 | Zimmer et al. | |
| 2006/0265605 A1 | 11/2006 | Ramezani | |
| 2007/0011137 A1 | 1/2007 | Kodama | |
| 2007/0106861 A1 | 5/2007 | Miyazaki et al. | |
| 2007/0136391 A1 | 6/2007 | Anzai et al. | |
| 2007/0143542 A1 | 6/2007 | Watanabe et al. | |
| 2007/0245006 A1 | 10/2007 | Lehikoinen et al. | |
| 2008/0154985 A1 | 6/2008 | Childs et al. | |
| 2008/0184000 A1 | 7/2008 | Kawaguchi | |
| 2008/0270461 A1 | 10/2008 | Gordon et al. | |
| 2009/0144416 A1 | 6/2009 | Chatley et al. | |
| 2009/0150639 A1 | 6/2009 | Ohata | |
| 2009/0248957 A1 | 10/2009 | Tzeng | |
| 2009/0300302 A1 | 12/2009 | Vaghani | |
| 2009/0307538 A1 | 12/2009 | Hernandez et al. | |
| 2009/0313415 A1 | 12/2009 | Sabaa et al. | |
| 2010/0049754 A1 | 2/2010 | Takaoka et al. | |
| 2010/0076933 A1 | 3/2010 | Hamilton et al. | |
| 2010/0100664 A1 | 4/2010 | Shimozono | |
| 2010/0115009 A1 | 5/2010 | Callahan et al. | |
| 2010/0274772 A1 | 10/2010 | Samuels | |
| 2010/0306500 A1 | 12/2010 | Mimatsu | |
| 2011/0161281 A1 | 6/2011 | Sayyaparaju et al. | |
| 2011/0218966 A1 | 9/2011 | Barnes et al. | |
| 2011/0289519 A1 | 11/2011 | Frost | |
| 2011/0314246 A1 | 12/2011 | Miller et al. | |
| 2012/0096059 A1 | 4/2012 | Shimizu et al. | |
| 2012/0250682 A1 | 10/2012 | Vincent et al. | |
| 2012/0250686 A1 | 10/2012 | Vincent et al. | |
| 2013/0139000 A1 | 5/2013 | Nakamura et al. | |
| 2013/0227236 A1 | 8/2013 | Flynn et al. | |
| 2014/0089619 A1 | 3/2014 | Khanna et al. | |
| 2014/0171190 A1 | 6/2014 | Diard | |
| 2014/0188953 A1 | 7/2014 | Lin et al. | |
| 2014/0195564 A1 | 7/2014 | Talagala et al. | |
| 2014/0279859 A1 | 9/2014 | Benjamin-deckert et al. | |
| 2015/0212909 A1 | 7/2015 | Sporel | |
| 2016/0117254 A1 | 4/2016 | Susarla et al. | |
| 2016/0259687 A1 | 9/2016 | Yoshihara et al. | |
| 2016/0275098 A1 | 9/2016 | Joseph | |
| 2016/0292179 A1 | 10/2016 | Von Muhlen et al. | |
| 2017/0131920 A1 | 5/2017 | Oshins et al. | |
| 2017/0132163 A1 | 5/2017 | Aslot et al. | |
| 2017/0169233 A1 | 6/2017 | Hsu et al. | |
| 2017/0286153 A1 | 10/2017 | Bak et al. | |
| 2018/0032249 A1 | 2/2018 | Makhervaks et al. | |
| 2018/0095915 A1 | 4/2018 | Prabhakar et al. | |
| 2018/0212825 A1* | 7/2018 | Umbehocker | H04L 41/12 |
| 2018/0307472 A1* | 10/2018 | Paul | H04L 63/0823 |
| 2019/0044946 A1 | 2/2019 | Hwang et al. | |
| 2019/0238590 A1* | 8/2019 | Talukdar | H04L 41/0893 |
| 2019/0339896 A1 | 11/2019 | Mccloskey et al. | |
| 2019/0347204 A1 | 11/2019 | Du et al. | |
| 2019/0377892 A1 | 12/2019 | Ben Dayan et al. | |
| 2020/0004452 A1 | 1/2020 | Kobayashi et al. | |
| 2020/0110554 A1 | 4/2020 | Yang | |
| 2020/0241805 A1 | 7/2020 | Armangau et al. | |
| 2021/0026774 A1 | 1/2021 | Lim | |
| 2021/0042141 A1 | 2/2021 | De Marco et al. | |
| 2021/0117246 A1 | 4/2021 | Lal et al. | |
| 2021/0160318 A1 | 5/2021 | Sajeepa et al. | |
| 2021/0173588 A1 | 6/2021 | Kannan et al. | |
| 2021/0182190 A1 | 6/2021 | Gao et al. | |
| 2021/0191638 A1 | 6/2021 | Miladinovic et al. | |
| 2021/0232331 A1 | 7/2021 | Kannan et al. | |
| 2021/0240611 A1 | 8/2021 | Tumanova et al. | |
| 2021/0243255 A1 | 8/2021 | Perneti et al. | |
| 2021/0249649 A1 | 8/2021 | Baba et al. | |
| 2021/0286517 A1 | 9/2021 | Karr et al. | |
| 2021/0286546 A1 | 9/2021 | Hodgson et al. | |
| 2021/0303164 A1 | 9/2021 | Grunwald et al. | |
| 2021/0303519 A1 | 9/2021 | Periyagaram et al. | |
| 2021/0303522 A1 | 9/2021 | Periyagaram et al. | |
| 2021/0303523 A1 | 9/2021 | Periyagaram et al. | |
| 2021/0311641 A1 | 10/2021 | Prakashaiah et al. | |
| 2021/0314404 A1 | 10/2021 | Glek | |
| 2021/0318827 A1 | 10/2021 | Bemat et al. | |
| 2021/0326048 A1 | 10/2021 | Karr | |
| 2021/0326223 A1 | 10/2021 | Grunwald et al. | |
| 2021/0334206 A1 | 10/2021 | Colgrove et al. | |
| 2021/0349636 A1 | 11/2021 | Gold et al. | |
| 2021/0349649 A1 | 11/2021 | Lee et al. | |
| 2021/0349653 A1 | 11/2021 | Dewitt et al. | |
| 2021/0373973 A1 | 12/2021 | Ekins et al. | |
| 2021/0382800 A1 | 12/2021 | Lee et al. | |
| 2022/0011945 A1 | 1/2022 | Coleman et al. | |
| 2022/0011955 A1 | 1/2022 | Juch et al. | |
| 2022/0019350 A1 | 1/2022 | Karr | |
| 2022/0019366 A1 | 1/2022 | Freilich et al. | |
| 2022/0019367 A1 | 1/2022 | Freilich et al. | |
| 2022/0019505 A1 | 1/2022 | Lee et al. | |
| 2022/0027051 A1 | 1/2022 | Kant et al. | |
| 2022/0027064 A1 | 1/2022 | Botes et al. | |
| 2022/0027472 A1 | 1/2022 | Golden et al. | |
| 2022/0035714 A1 | 2/2022 | Schultz et al. | |
| 2022/0050858 A1 | 2/2022 | Karr et al. | |
| 2022/0075546 A1 | 3/2022 | Potyraj et al. | |
| 2022/0075760 A1 | 3/2022 | Wu et al. | |
| 2022/0137855 A1 | 5/2022 | Irwin et al. | |
| 2022/0138223 A1 | 5/2022 | Sonner et al. | |
| 2022/0147253 A1 | 5/2022 | Sajeepa et al. | |
| 2022/0147365 A1 | 5/2022 | Bemat et al. | |
| 2022/0156152 A1 | 5/2022 | Gao et al. | |
| 2022/0164120 A1 | 5/2022 | Kannan et al. | |
| 2022/0171648 A1 | 6/2022 | Rodriguez et al. | |

(56) References Cited

U.S. PATENT DOCUMENTS

| | | |
|---|---|---|
| 2022/0180950 A1 | 6/2022 | Kannan et al. |
| 2022/0197505 A1 | 6/2022 | Kannan et al. |
| 2022/0197689 A1 | 6/2022 | Hotinger et al. |
| 2022/0206691 A1 | 6/2022 | Lee et al. |
| 2022/0206696 A1 | 6/2022 | Gao et al. |
| 2022/0206702 A1 | 6/2022 | Gao et al. |
| 2022/0206910 A1 | 6/2022 | Vaideeswaran et al. |
| 2022/0215111 A1 | 7/2022 | Ekins |
| 2022/0229851 A1* | 7/2022 | Danilov .............. G06F 11/2094 |
| 2022/0232075 A1 | 7/2022 | Emerson et al. |
| 2022/0236904 A1 | 7/2022 | Miller et al. |
| 2022/0253216 A1 | 8/2022 | Grunwald et al. |
| 2022/0253389 A1 | 8/2022 | Fay et al. |
| 2022/0261164 A1 | 8/2022 | Zhuravlev et al. |
| 2022/0261170 A1 | 8/2022 | Vohra et al. |
| 2022/0261178 A1 | 8/2022 | He et al. |
| 2022/0261286 A1 | 8/2022 | Wang et al. |
| 2022/0263897 A1 | 8/2022 | Karr et al. |
| 2022/0269418 A1 | 8/2022 | Black et al. |
| 2022/0291837 A1 | 9/2022 | Shao et al. |
| 2022/0291858 A1 | 9/2022 | Dewitt et al. |
| 2022/0291986 A1 | 9/2022 | Klein et al. |
| 2022/0300193 A1 | 9/2022 | Gao et al. |
| 2022/0300198 A1 | 9/2022 | Gao et al. |
| 2022/0300413 A1 | 9/2022 | Kannan et al. |
| 2022/0318264 A1 | 10/2022 | Jain et al. |
| 2022/0334725 A1 | 10/2022 | Mertes et al. |
| 2022/0334929 A1 | 10/2022 | Potyraj et al. |
| 2022/0334990 A1 | 10/2022 | Karr et al. |
| 2022/0335005 A1 | 10/2022 | Fernandez et al. |
| 2022/0335009 A1 | 10/2022 | Paul et al. |
| 2022/0350495 A1 | 11/2022 | Lee et al. |
| 2022/0350515 A1 | 11/2022 | Bono et al. |
| 2022/0350543 A1 | 11/2022 | Bono et al. |
| 2022/0350544 A1 | 11/2022 | Bono et al. |
| 2022/0350545 A1 | 11/2022 | Bono et al. |

OTHER PUBLICATIONS

International Search Report and Written Opinion issued in corresponding PCT Application No. PCT/US2021/030138 dated Jan. 21, 2022 (16 pages).

International Search Report and Written Opinion issued in corresponding PCT Application No. PCT/US2021/030141 dated Jan. 4, 2022 (11 pages).

Thompson et al., "GPUDirect Storage: A Direct Path Between Storage and GPU Memory", Technical Blog, Aug. 6, 2019, NVIDIA Corporation, (8 pages).

Y. Yamato, "Proposal of Automatic GPU Offloading Method from Various Language Applications", 2021 9th International Conference on Information and Education Technology, DOI: 10.1109/ICIET51873.2021.9419618, pp. 400-404 (5 pages).

* cited by examiner

METHODS AND SYSTEMS FOR DISTRIBUTING TOPOLOGY INFORMATION TO CLIENT NODES

BACKGROUND

Applications generate and/or manipulate large amounts of data. Thus, the performance of these applications is typically impacted by the manner in which the applications may read and/or write data.

DETAILED DESCRIPTION

Figure 1A:
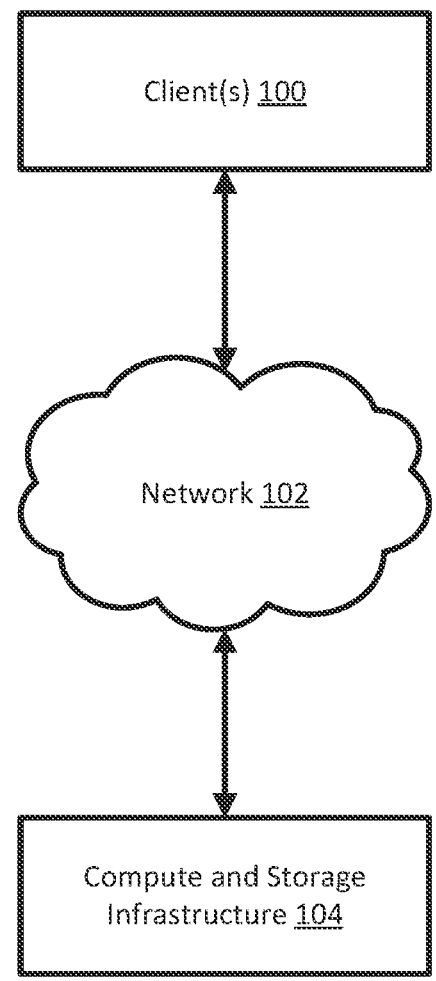
FIG. 1A shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging memory devices (e.g., persistent memory (defined below) and NVMe devices (defined below)) to improve performance of data requests (e.g., read and write requests). More specifically, various embodiments of the invention embodiments of the invention enable applications (e.g., applications in the application container in FIG. 2A) to issue data requests (e.g., requests to read and write data) to the operating system (OS). The OS receives such requests and processes them using an implementation of the portable operating system interface (POSIX). The client FS container may receive such requests via POSIX and subsequently process such requests. The processing of these requests includes interacting with metadata nodes (see e.g., FIG. 3) to obtain data layouts that provide a mapping between file offsets and scale out volume offsets (SOVs) (see e.g., FIGS. 6A-6B). Using the SOVs, the memory hypervisor module in the client FS container (see e.g., FIG. 2B) issues input/output (I/O) requests, via a fabric (also referred to as a communication fabric, described below), directly to the locations in the storage pool (110) (see e.g., FIG. 6B), bypassing the storage stack on the metadata nodes. Once the requested I/O is performed on the storage pool, a response is provided, via POSIX, to the application.

Using the aforementioned architecture, embodiments of the invention enable applications to interact with the memory devices at scale in a manner that is transparent to the applications. Said another way, the OS may continue to interact with the client FS container using POSIX and the client FS container, in turn, will provide a transparent mechanism to translate the requests received via POSIX into I/O requests that may be directly serviced by the storage pool.

Various embodiments of the invention are designed to support large numbers of client application nodes (e.g., thousands of client application nodes), where the client application nodes are able to access a large storage pool (e.g., a storage pool with petabytes of storage). To support the configuration and management of the aforementioned large distributed system, embodiments of the invention provide one or more mechanisms to seamlessly generate and distribute the information necessary for the client application nodes to ultimately be able to configure themselves. See e.g., FIGS. 8A-8D.

FIG. 1A shows a diagram of a system in accordance with one or more embodiments of the invention. The system includes one or more clients (100), operatively connected to a network (102), which is operatively connected to one or more node(s) (not shown) in a compute and storage infrastructure (CSI) (104). The components illustrated in FIG. 1A may be connected via any number of operable connections supported by any combination of wired and/or wireless networks (e.g., network (102)). Each component of the system of FIG. 1A is discussed below.

In one embodiment of the invention, the one or more clients (100) are configured to issue requests to the node(s) in the CSI (104) (or to a specific node of the node(s)), to receive responses, and to generally interact with the various components of the nodes (described below).

In one or more embodiments of the invention, one or more clients (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the one or more clients (100) are implemented as a logical device. The logical device may utilize the computing resources of any number of computing devices and thereby provide the functionality of the one or more clients (100) described throughout this application.

In one or more embodiments of the invention, the one or more clients (100) may request data and/or send data to the node(s) in the CSI (104). Further, in one or more embodiments, the one or more clients (100) may initiate an application to execute on one or more client application nodes in the CSI (104) such that the application may, itself, gather, transmit, and/or otherwise manipulate data on the client application nodes, remote to the client(s). In one or more embodiments, one or more clients (100) may share access to the same one or more client application nodes in the CSI (104) and may similarly share any data located on those client application nodes in the CSI (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) in the CSI (104)) operatively connected to the network (102). In one embodiment of the invention, the one or more clients (100) are operatively connected to the node(s) (104) via a network (e.g., network (102)).

The CSI (104) includes one or more client application nodes, one or more metadata nodes, one or more management nodes, and zero, one or more storage nodes. Additional detail about the architecture of the CSI is provided below in FIG. 1B. Further, various embodiments of the node(s) (104) are provided in FIGS. 2A-FIG. 5 below.

While FIG. 1A shows a specific configuration of a system, other configurations may be used without departing from the scope of the disclosure. For example, although the one or more clients (100) and node(s) (104) are shown to be operatively connected through network (102), one or more clients (100) and node(s) (104) may be directly connected, without an intervening network (e.g., network (102)). Further, the functioning of the one or more clients (100) and the node(s) in the CSI (104) is not dependent upon the functioning and/or existence of the other device(s) (e.g., node(s) (104) and one or more clients (100), respectively). Rather, the one or more clients (100) and the node(s) in the CSI (104) may function independently and perform operations locally that do not require communication with other devices. Accordingly, embodiments disclosed herein should not be limited to the configuration of devices and/or components shown in FIG. 1A.

Figure 1B:
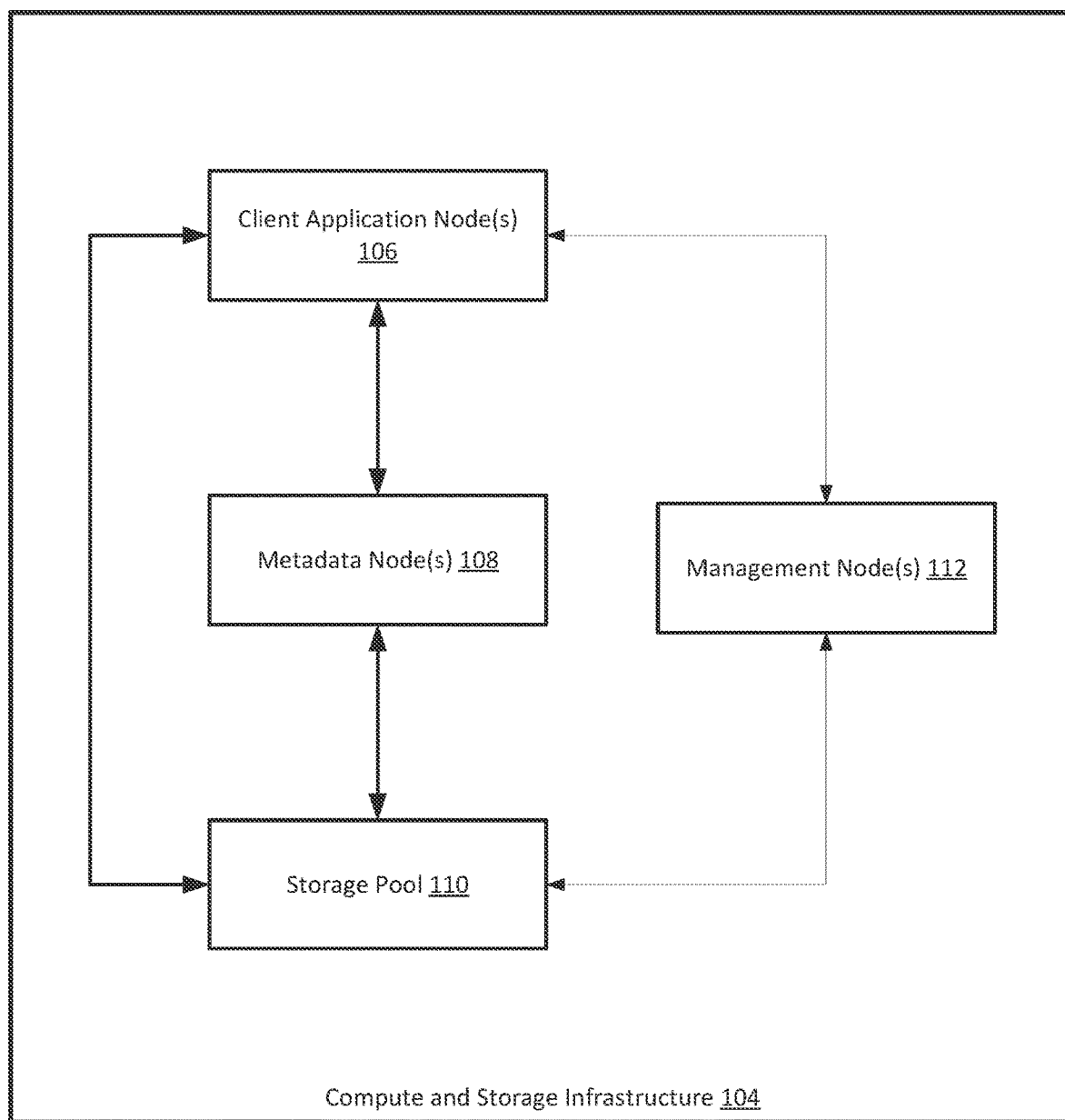
FIG. 1B shows a diagram of computer and storage infrastructure (CSI) in accordance with one or more embodiments of the invention.

FIG. 1B shows a diagram of computer and storage infrastructure (CSI) in accordance with one or more embodiments of the invention. As discussed above, the client application node(s) (106) executes applications and interacts with the metadata node(s) (108) to obtain, e.g., data layouts and other information (as described below) to enable the client application nodes to directly issue I/O requests to memory devices (or other storage media), which may be located on the client application nodes, the metadata nodes and/or the storage nodes, while bypassing the storage stack (e.g., the metadata server and the file system) on the metadata nodes. To that end, the client application nodes are able to directly communicate over a communication fabric(s) using various communication protocols, e.g., using Non-Volatile Memory Express (NVMe) over Fabric (NVMe-oF) and/or persistent memory over Fabric (PMEMoF), with the storage media in the storage pool (110) (see e.g., FIG. 6B).

In one embodiment of the invention, the CSI (104) also includes a management node(s) (112) that is configured to interact with the storage pool to generate the topology file (see e.g., FIG. 8A) and to distribute the topology file, namespace information, and file system information to the client application nodes (see e.g., FIGS. 8A-8D).

Figure 2A:
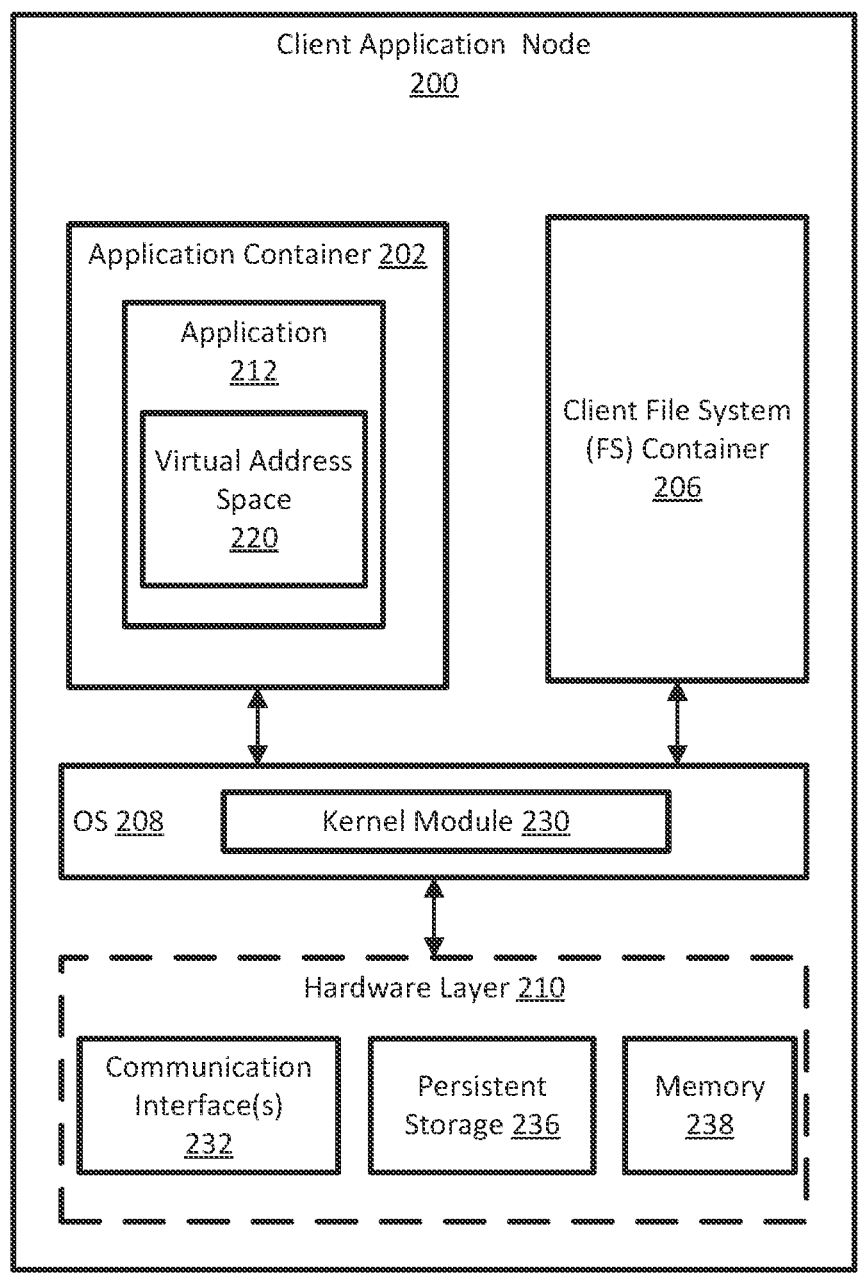
FIG. 2A shows a diagram of a client application node in accordance with one or more embodiments of the invention.
Figure 2B:
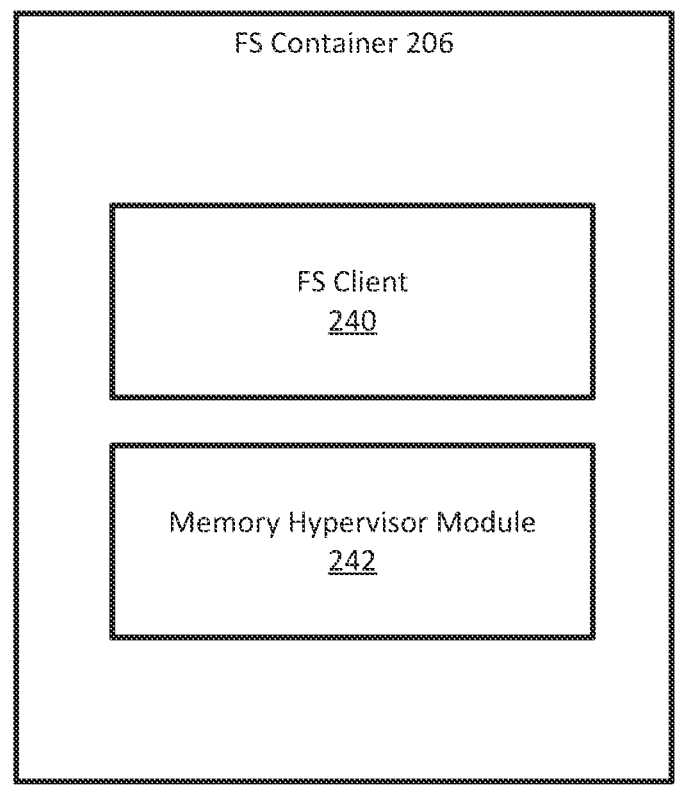
FIG. 2B shows a diagram of a client file system (FS) container in accordance with one or more embodiments of the invention.

FIGS. 2A-2B show diagrams of a client application node (200) in accordance with one or more embodiments of the invention. In one embodiment of the invention, client application node (200) includes one or more application container(s) (e.g., application container (202)), a client FS container (206), an operating system (OS) (208), and a hardware layer (210). Each of these components is described below. In one or more embodiments of the invention, the client application node (200) (or one or more components therein) is configured to perform all, or a portion, of the functionality described in FIGS. 8A-10.

In one or more embodiments of the invention, an application container (202) is software executing on the client application node. The application container (202) may be an independent software instance that executes within a larger container management software instance (not shown) (e.g., Docker®, Kubernetes®). In embodiments in which the application container (202) is executing as an isolated software instance, the application container (202) may establish a semi-isolated virtual environment, inside the container, in which to execute one or more applications (e.g., application (212).

In one embodiment of the invention, an application container (202) may be executing in "user space" (e.g., a layer of the software that utilizes low-level system components for the execution of applications) of the OS (208) of the client application node (200).

In one or more embodiments of the invention, an application container (202) includes one or more applications (e.g., application (212)). An application (212) is software executing within the application container (e.g., 202), that may include instructions which, when executed by a processor(s) (not shown) (in the hardware layer (210)), initiate the performance of one or more operations of components of the hardware layer (210). Although applications (212) are shown executing within application containers (202) of FIG. 2A, one or more applications (e.g., 212) may execute outside of an application container (e.g., 212). That is, in one or more embodiments, one or more applications (e.g., 212) may execute in a non-isolated instance, at the same level as the application container (202) or client FS container (206).

In one or more embodiments of the invention, each application (212) includes a virtual address space (e.g., virtual address space (220)). In one embodiment of the invention, a virtual address space (220) is a simulated range of addresses (e.g., identifiable locations) that mimics the physical locations of one or more components of the hardware layer (210). In one embodiment, an application (212) is not configured to identify the physical addresses of one or more components of the hardware layer (210); rather, the application (212) relies on other components of the client application node (200) to translate one or more virtual addresses of the virtual address space (e.g., 220) to one or more physical addresses of one or more components of the hardware layer (210). Accordingly, in one or more embodiments of the invention, an application may utilize a virtual address space (220) to read, write, and/or otherwise manipulate data, without being configured to directly identify the physical address of that data within the components of the hardware layer (210).

Figure 9:
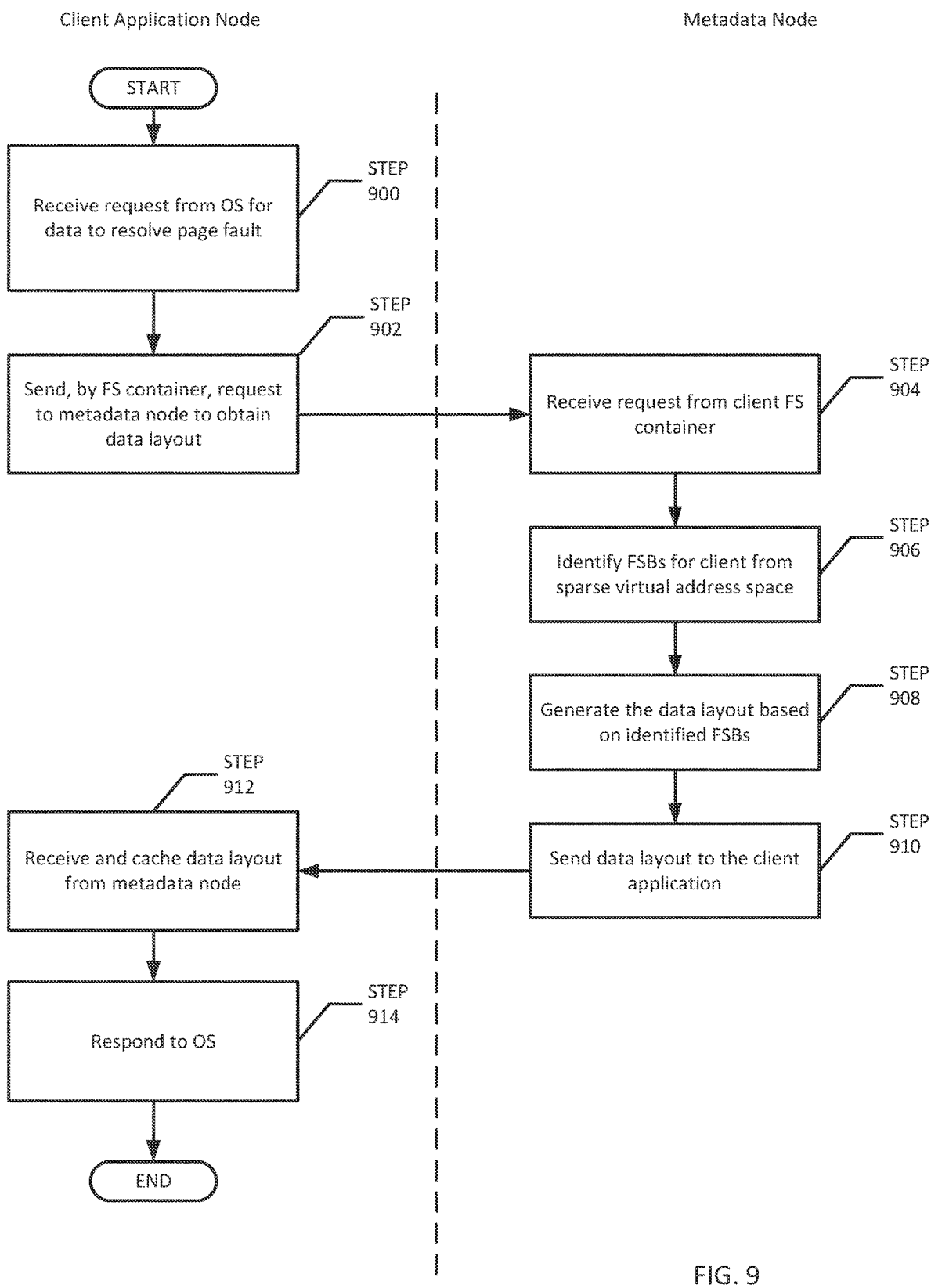
FIG. 9 shows a flowchart of a method of generating and servicing a mapping request in accordance with one or more embodiments of the invention.

Additionally, in one or more embodiments of the invention, an application may coordinate with other components of the client application node (200) to establish a mapping, see e.g., FIG. 9, between a virtual address space (e.g., 220) and underlying physical components of the hardware layer (210). In one embodiment, if a mapping is established, an application's use of the virtual address space (e.g., 220) enables the application to directly manipulate data in the hardware layer (210), without relying on other components of the client application node (200) to repeatedly update mappings between the virtual address space (e.g., 220) and the physical addresses of one or more components of the hardware layer (210). The above discussion with respect to the application's ability to interact with the hardware layer (210) is from the perspective of the application (212). However, as discussed below, the client FS container (206) (in conjunction with the metadata nodes) transparently enables to the application to ultimately read and write (or otherwise manipulate) data remoted and stored in the storage pool.

In one or more embodiments of the invention, a client FS container (206) is software executing on the client application node (200). A client FS container (206) may be an independent software instance that executes within a larger container management software instance (not shown) (e.g., Docker®, Kubernetes®, etc.). In embodiments in where the client FS container (206) is executing as an isolated software instance, the client FS container (206) may establish a semi-isolated virtual environment, inside the container, in which to execute an application (e.g., FS client (240) and memory hypervisor module (242), described below). In one embodiment of the invention, a client FS container (206) may be executing in "user space" (e.g., a layer of the software that utilizes low-level system components for the execution of applications) of the OS (208).

Referring to FIG. 2B, in one embodiment of the invention, the client FS container (206) includes an FS client (240) and a memory hypervisor module (242). In one embodiment, a FS client (240) is software executing within the client FS container (206). The FS client (204) is a local file system that includes functionality to interact with the OS using POSIX (i.e., using file semantics). Said another way, from the perspective of the OS, the FS client is the file system for the client application node and it is a POSIX file system. However, while the FS client interacts with the OS using POSIX, the FS client also includes functionality to interact with the metadata nodes, the management nodes and the memory hypervisor module using protocols other than POSIX (e.g., using memory semantics instead of file semantics).

In one or more embodiments of the invention, FS client (240) may include functionality to generate one or more virtual-to-physical address mappings by translating a virtual address of a virtual address space (220) to a physical address of a component in the hardware layer (210). Further, in one embodiment of the invention, the FS client (240) may further be configured to communicate one or more virtual-to-physical address mappings to one or more components of the hardware layer (210) (e.g., memory management unit (not shown)). In one embodiments of the invention, the FS client (240) tracks and maintains various mappings as described below in FIGS. 6A-6B. Additionally, in one or more embodiments of the invention, FS client (240) is configured to initiate the generation and issuance of I/O requests by the memory hypervisor module (242) (see e.g., FIGS. 8A-10).

In one embodiment of the invention, the memory hypervisor module (242) is software executing within the client FS container (206) that includes functionality to generate and issue I/O requests over fabric directly to storage media in the storage pool. Additional detail about the operation of the memory hypervisor module is described below in FIGS. 8A-10.

Returning to FIG. 2A, in one or more embodiments of the invention, an OS (208) is software executing on the client application node (200). In one embodiment of the invention, an OS (208) coordinates operations between software executing in "user space" (e.g., containers (202, 206), applications (212)) and one or more components of the hardware layer (210) to facilitate the proper use of those hardware layer (210) components. In one or more embodiments of the invention, the OS (208) includes a kernel module (230). In one embodiment of the invention, the kernel module (230)

is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (210) is a collection of physical components configured to perform the operations of the client application node (200) and/or otherwise execute the software of the client application node (200) (e.g., those of the containers (202, 206), applications (e.g., 212)).

In one embodiment of the invention, the hardware layer (210) includes one or more communication interface(s) (232). In one embodiment of the invention, a communication interface (232) is a hardware component that provides capabilities to interface the client application node (200) with one or more devices (e.g., a client, another node in the CSI (104), etc.) and allow for the transmission and receipt of data (including metadata) with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the communication interface (232) may implement and/or support one or more protocols to enable the communication between the client application nodes and external entities (e.g., other nodes in the CSI, one or more clients, etc.). For example, the communication interface (232) may enable the client application node to be operatively connected, via Ethernet, using a TCP/IP protocol to form a "network fabric" and enable the communication of data between the client application node and other external entities. In one or more embodiments of the invention, each node within the CSI may be given a unique identifier (e.g., an IP address) to be used when utilizing one or more protocols.

Further, in one embodiment of the invention, the communication interface (232), when using certain a protocol or variant thereof, supports streamlined access to storage media of other nodes in the CSI. For example, when utilizing remote direct memory access (RDMA) to access data on another node in the CSI, it may not be necessary to interact with the software (or storage stack) of that other node in the CSI. Rather, when using RDMA, it may be possible for the client application node to interact only with the hardware elements of the other node to retrieve and/or transmit data, thereby avoiding any higher-level processing by the software executing on that other node. In other embodiments of the invention, the communicate interface enables direct communication with the storage media of other nodes using Non-Volatile Memory Express (NVMe) over Fabric (NVMe-oF) and/or persistent memory over Fabric (PMEMoF) (both of which may (or may not) utilize all or a portion of the functionality provided by RDMA).

In one embodiment of the invention, the hardware layer (210) includes one or more processor(s) (not shown). In one embodiment of the invention, a processor may be an integrated circuit(s) for processing instructions (e.g., those of the containers (202, 206), applications (e.g., 212) and/or those received via a communication interface (232)). In one embodiment of the invention, processor(s) may be one or more processor cores or processor micro-cores. Further, in one or more embodiments of the invention, one or more processor(s) may include a cache (not shown) (as described).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of client application node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), magnetic storage (e.g., hard disk drive (HDD), floppy disk, tape, diskette, etc.), or optical media (e.g., compact disc (CD), digital versatile disc (DVD), NVMe devices, computational storage, etc.). In one embodiment of the invention, NVMe device is a persistent storage that includes SSD that is accessed using the NVMe® specification (which defines how applications communicate with SSD via a peripheral component interconnect express) bus. In one embodiment of the invention, computational storage is persistent storage that includes persistent storage media and microprocessors with domain-specific functionality to efficiently perform specific tasks on the data being stored in the storage device such as encryption and compression.

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of client application node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212), containers (202, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory (238).

Examples of memory (238) include, but are not limited to, certain integrated circuit storage (e.g., flash memory, random access memory (RAM), dynamic RAM (DRAM), resistive RAM (ReRAM), etc.) and Persistent Memory (PMEM). PMEM is a solid-state high-performance byte-addressable memory device that resides on the memory bus, where the location of the PMEM on the memory bus allows PMEM to have DRAM-like access to data, which means that it has nearly the same speed and latency of DRAM and the non-volatility of NAND flash.

In one embodiment of the invention, the hardware layer (210) includes a memory management unit (MMU) (not shown). In one or more embodiments of the invention, an MMU is hardware configured to translate virtual addresses (e.g., those of a virtual address space (220)) to physical addresses (e.g., those of memory (238)). In one embodiment of the invention, an MMU is operatively connected to memory (238) and is the sole path to access any memory device (e.g., memory (238)) as all commands and data destined for memory (238) must first traverse the MMU prior to accessing memory (238). In one or more embodiments of the invention, an MMU may be configured to handle memory protection (allowing only certain applications to access memory) and provide cache control and bus arbitration. Further, in one or more embodiments of the invention, an MMU may include a translation lookaside buffer (TLB) (as described below).

While FIGS. 2A-2B show a specific configuration of a client application node, other configurations may be used without departing from the scope of the disclosure. Accordingly, embodiments disclosed herein should not be limited to the configuration of devices and/or components shown in FIGS. 2A-2B.

Figure 3:
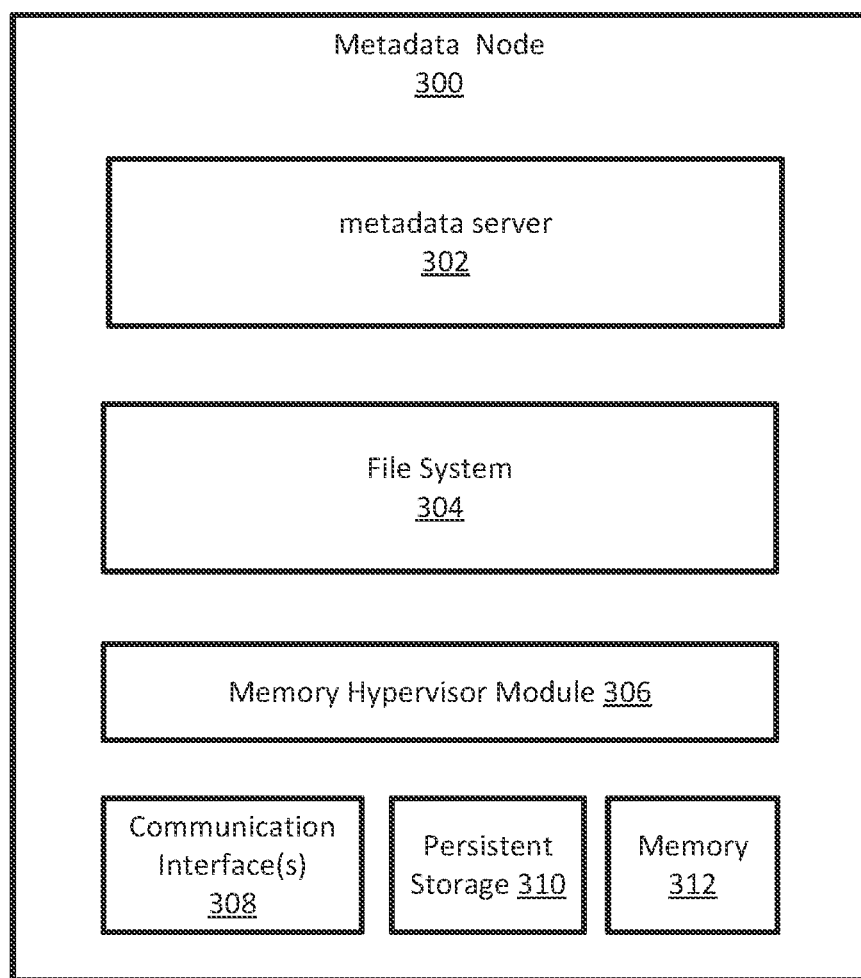
FIG. 3 shows an example of a metadata node in accordance with one or more embodiments of the invention.

FIG. 3 shows an example of a metadata node in accordance with one or more embodiments of the invention. In one embodiment of the invention, metadata node (300) includes a metadata server (302), a file system (304), a memory hypervisor module (306), an OS (not shown), a communication interface(s) (308), persistent storage (310), and memory (312). Each of these components is described below. In one or more embodiments of the invention, the metadata node (300) (or one or more components therein) is configured to perform all, or a portion, of the functionality described in FIGS. 8A-10.

In one embodiment of the invention, the metadata server (302) includes functionality to manage all or a portion of the metadata associated with the CSI. The metadata server (302) also includes functionality to service requests for data layouts that it receives from the various client application nodes. Said another way, each metadata node may support multiple client application nodes. As part of this support, the client application nodes may send data layout requests to the metadata node (300). Metadata node (300), in conjunction with the file system (304), generates and/or obtains the requested data layouts and provides the data layouts to the appropriate client application nodes. The data layouts provide a mapping between file offsets and [SOV, offset]s (see e.g., FIG. 6A-6B). While FIG. 3 shows a single file system, a given metadata node may support multiple file systems.

Figure 6A:
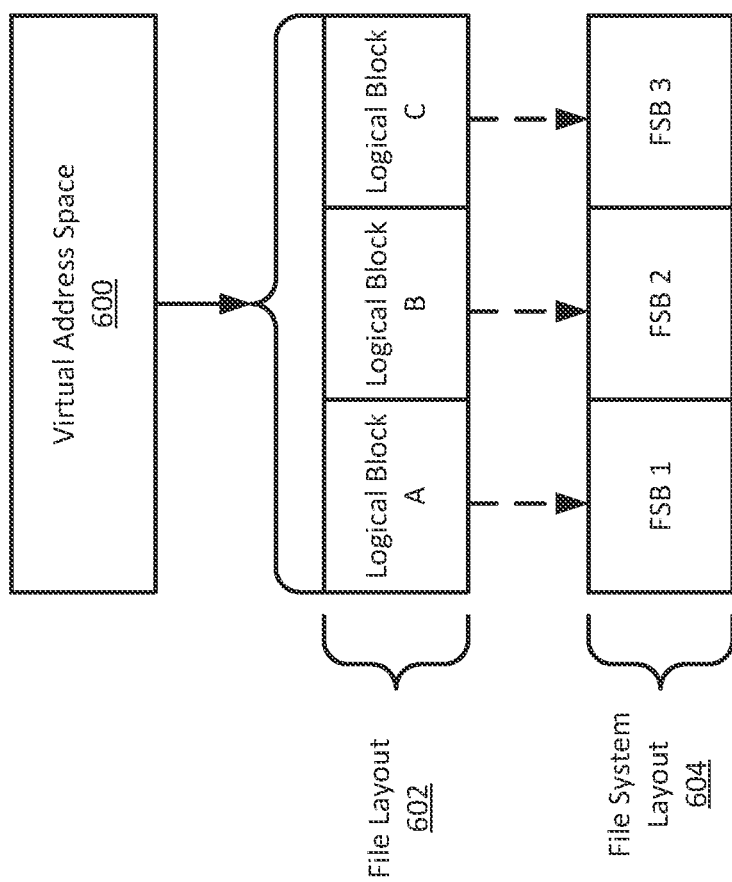
FIG. 6A shows relationships between various virtual elements in the system in accordance with one or more embodiments of the invention.
Figure 6B:
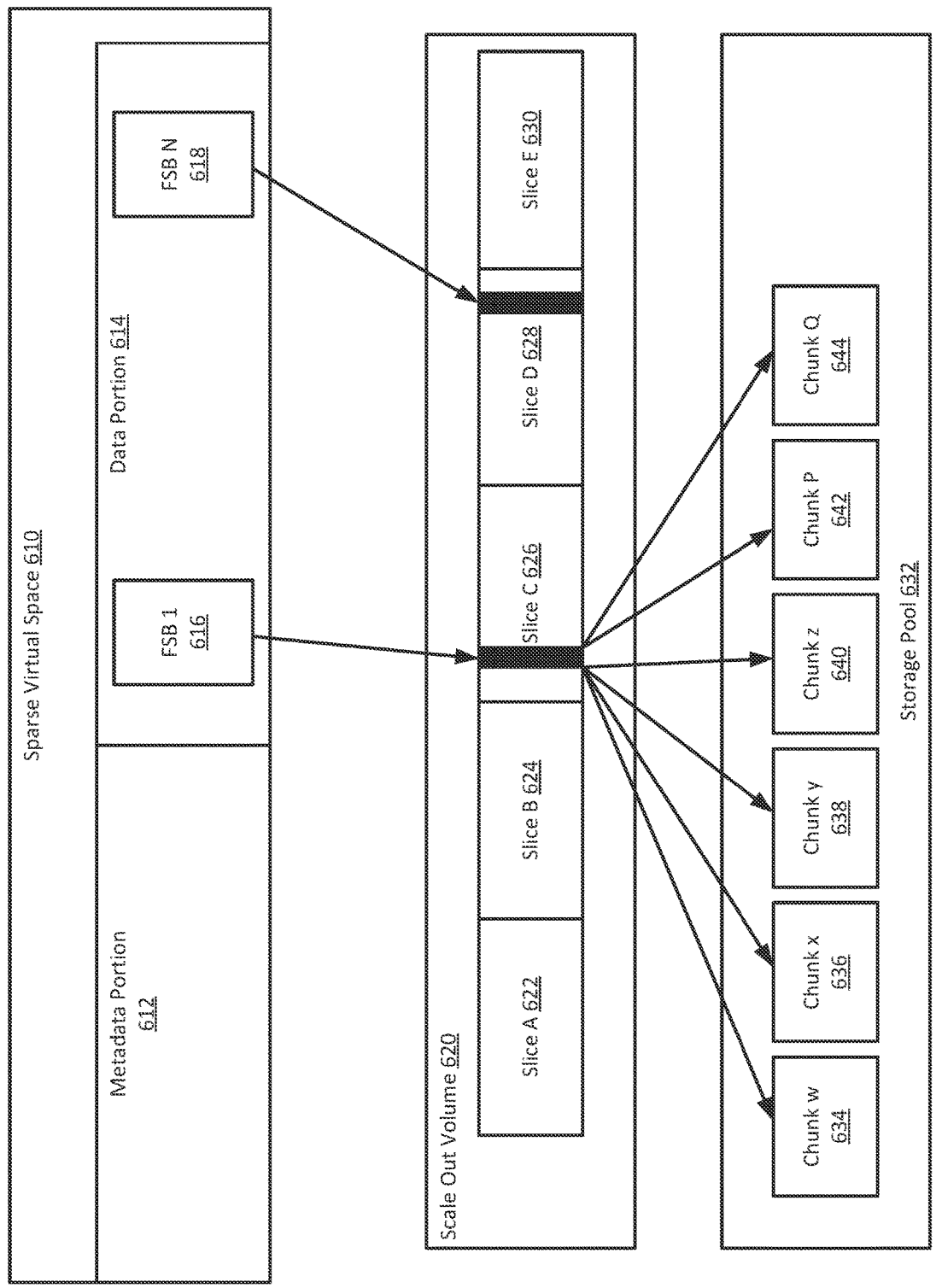
FIG. 6B shows relationships between various virtual and physical elements in the system in accordance with one or more embodiments of the invention.

In one embodiment of the invention, the file system (304) includes functionality to manage a sparse virtual space (see e.g., FIG. 6B, 610) as well as the mapping between the sparse virtual space and an underlying SOV(s) (see e.g., FIG. 6B, 620). The file system (304), the metadata server (302), or another component in the metadata node (300) manages the mappings between the SOV(s) and the underlying storage media in the storage pool. Additional detail about the sparse virtual space and the SOV(s) is provided below with respect to FIGS. 6A-6B.

In one embodiment of the invention, the memory hypervisor module (306) is substantially the same as the memory hypervisor module described in FIG. 2B (e.g., 242).

In one embodiment of the invention, the metadata node (300) includes one or more communication interfaces (308). The communication interfaces are substantially the same as the communication interfaces described in FIG. 2A (e.g., 232).

In one embodiment of the invention, metadata node (300) includes one or more processor(s) (not shown). In one embodiment of the invention, a processor may be an integrated circuit(s) for processing instructions (e.g., those of the metadata server (302), file system (304) and/or those received via a communication interface(s) (308)). In one embodiment of the invention, processor(s) may be one or more processor cores or processor micro-cores. Further, in one or more embodiments of the invention, one or more processor(s) may include a cache (not shown) (as described).

In one or more embodiments of the invention, the metadata node includes persistent storage (310), which is substantially the same as the persistent storage described in FIG. 2A (e.g., 236).

In one or more embodiments of the invention, the metadata node includes memory (312), which is substantially similar to memory described in FIG. 2A (e.g., 238).

Figure 4:
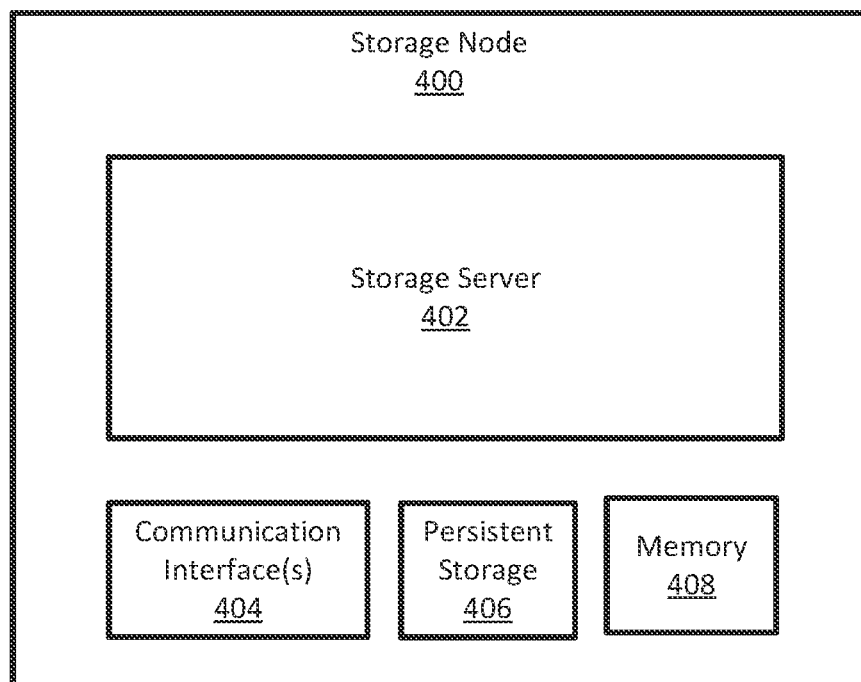
FIG. 4 shows an example of a storage node in accordance with one or more embodiments of the invention.

FIG. 4 shows an example of a storage node in accordance with one or more embodiments of the invention. In one embodiment of the invention, storage node (400) includes a storage server (402), an OS (not shown), a communication interface(s) (404), persistent storage (406), and memory (408). Each of these components is described below. In one or more embodiments of the invention, the storage node (400) (or one or more components therein) is configured to perform all, or a portion, of the functionality described in FIGS. 8A-10.

In one embodiment of the invention, the storage server (402) includes functionality to manage the memory (408) and persistent storage (406) within the storage node.

In one embodiment of the invention, the storage node includes communication interface(s) (404), which is substantially the same as the communication interface(s) described in FIG. 2A (e.g., 232).

In one embodiment of the invention, storage node (400) includes one or more processor(s) (not shown). In one embodiment of the invention, a processor may be an integrated circuit(s) for processing instructions (e.g., those of the storage server (402), and/or those received via a communication interface (404)). In one embodiment of the invention, processor(s) may be one or more processor cores or processor micro-cores. Further, in one or more embodiments of the invention, one or more processor(s) may include a cache (not shown) (as described).

In one or more embodiments of the invention, the storage node includes persistent storage (406), which is substantially the same as the persistent storage described in FIG. 2A (e.g., 236).

In one or more embodiments of the invention, the storage node includes memory (408), which is substantially similar to memory described in FIG. 2A (e.g., 238).

Figure 5:
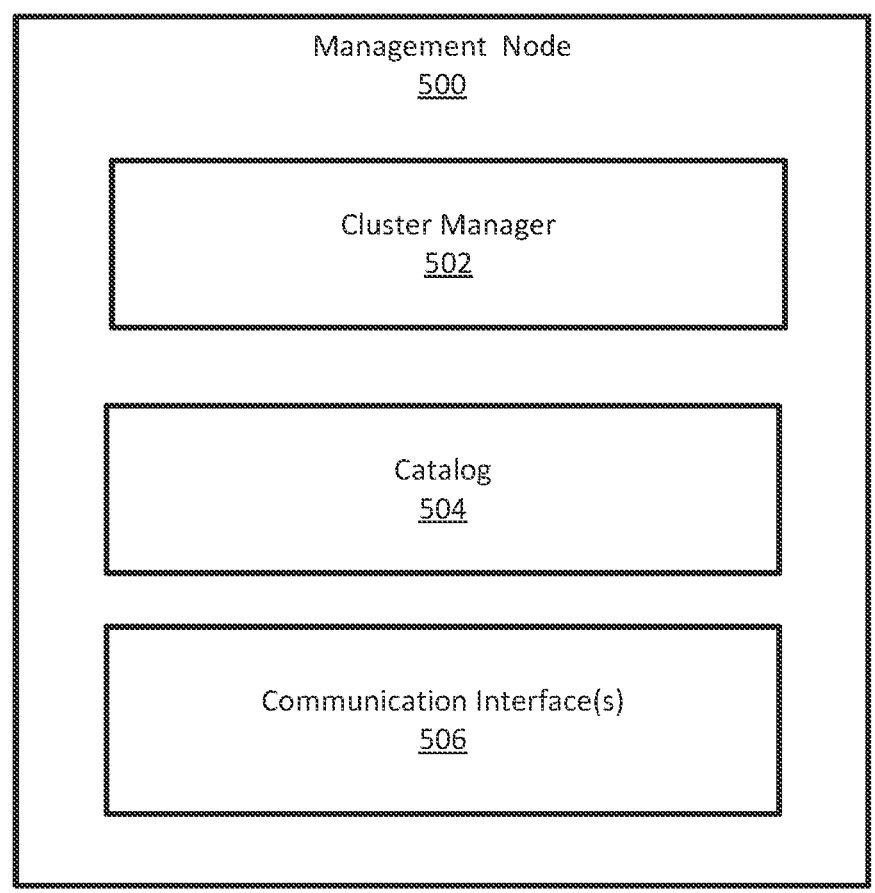
FIG. 5 shows an example of a management node in accordance with one or more embodiments of the invention.

FIG. 5 shows an example of a management node in accordance with one or more embodiments of the invention. In one embodiment of the invention, management node (500) includes a cluster manager (502), a catalog (504), an OS (not shown), a communication interface(s) (506), persistent storage (not shown), and memory (not shown). In one or more embodiments of the invention, the management node (500) (or one or more components therein) is configured to perform all, or a portion, of the functionality described in FIGS. 8A-10.

In one embodiment of the invention, the cluster manager (502) includes functionality to manage the deployment and configuration of the client application nodes and metadata nodes within the distributed system.

In one embodiment of the invention, the catalog (504) is a file system (which may be an in-memory file system) that is configured to store the topology file and namespace information. The catalog (504) is also configured to export its contents to the client application nodes. The specific client application nodes that receive content from the catalog may be specified using export rules associated with the namespace.

In one embodiment of the invention, the management node includes communication interface(s) (506), which is substantially the same as the communication interface(s) described in FIG. 2A (e.g., 232).

In one embodiment of the invention, management node (500) includes one or more processor(s) (not shown). In one embodiment of the invention, a processor may be an integrated circuit(s) for processing instructions (e.g., those of the cluster manager (502), the catalog (504), and/or those received via a communication interface (506)). In one embodiment of the invention, processor(s) may be one or more processor cores or processor micro-cores. Further, in one or more embodiments of the invention, one or more processor(s) may include a cache (not shown) (as described).

In one or more embodiments of the invention, the management node includes persistent storage, which is substantially the same as the persistent storage described in FIG. 2A (e.g., 236).

In one or more embodiments of the invention, the management node includes memory, which is substantially similar to memory described in FIG. 2A (e.g., 238).

In one embodiment of the invention, while the metadata node and the management node are described as separate nodes, in various embodiments of the invention, the functionality of the metadata node and the management node may be implemented on a single node.

FIGS. 6A-6B show relationships between various physical and virtual elements in the system in accordance with one or more embodiments of the invention. More specifically, FIGS. 6A-6B show the mappings that are maintained by the various nodes in the CSI in order to permit applications to read and/or write data in storage media in a storage pool.

Referring to FIG. 6A, applications (e.g., 212) executing in the application containers (e.g., 202) read and write from a virtual address space (600). The OS (e.g., 208) provides a mapping between offsets in the virtual address space (600) to corresponding logical blocks (e.g., logical block A, logical block B, logical block C) arranged in a file layout (602). Said another way, the OS maps segments of a virtual address space into a "file," where a virtual address space segment (i.e., a portion of the virtual address space) (not shown) is mapped to a file offset (i.e., an offset in a file defined by the file layout (602)).

When the OS (e.g., 208) interacts with the FS client (e.g., 240), it uses the file name (or file identifier) and offset to refer to a specific location from which the application (e.g., 212) is attempting to read or write. The FS client (e.g., 240) maps the logical blocks (e.g., logical block A, logical block B, logical block C) (which are specified using [file name, offset]) to corresponding file system blocks (FSBs) (e.g., FSB1, FSB2, FSB3). The FSBs that correspond to a given file layout (602) may be referred to as file system layout (604). In one embodiment of the invention, the file layout (602) typically includes a contiguous set of logical blocks, while the file system layout (604) typically includes a set of FSBs, which may or may not be contiguous FSBs. The mapping between the file layout (602) and the file system layout (604) is generated by the metadata server.

Referring to FIG. 6B, the FSBs (e.g., FSB 1 (616), FSB N (618)) correspond to FSBs in a sparse virtual space (610). In one embodiment of the invention, the sparse virtual space (610) is a sparse, virtual data structure that provides a comprehensive layout and mapping of data managed by the file system (e.g., FIG. 3, 304) in the metadata node. Thus, while there may be multiple virtual address space(s) (e.g., virtual address space (600)) and there may be multiple SOVs (620) there is only one sparse virtual space (610).

In one embodiment of the invention, the sparse virtual space (610) may be allocated with several petabytes of sparse space, with the intention being that the aggregate space of the storage media in the storage pool (632) will not exceed several petabytes of physical storage space. Said another way, the sparse virtual space (610) is sized to support an arbitrary number of virtual address spaces and an arbitrary amount of storage media such that the size of the sparse virtual space (610) remains constant after it has been initialized.

The sparse virtual space (610) may be logically divided into a metadata portion (612) and a data portion (614). The metadata portion (612) is allocated for the storage of file system metadata and FS client metadata. The file system metadata and the FS client metadata may correspond to any metadata (examples of which are described through this application to enable (or that enables) the file system and the FS client to implement one or more embodiments of the invention. The data portion (614) is allocated for the storage of data that is generated by applications (e.g., 212) executing on the client application nodes (e.g., 200). Each of the aforementioned portions may include any number of FSBs (e.g., 616, 618).

In one or more embodiments of the invention, each FSB may be uniformly sized throughout the sparse virtual space (610). In one or more embodiments of the invention, each FSB may be equal to the largest unit of storage in storage media in the storage pool. Alternatively, in one or more embodiments of the invention, each FSB may be allocated to be sufficiently larger than any current and future unit of storage in storage media in the storage pool.

In one or more embodiments of the invention, one or more SOVs (e.g., 620) are mapped to FSBs in the sparse virtual space (610) to ultimately link the FSBs to storage media.

More specifically, each SOV is a virtual data space that is mapped to corresponding physical regions of a portion of, one, or several storage devices, which may include one or more memory devices and one or more persistent storage devices. The SOV(s) (e.g., 620) may identify physical regions of the aforementioned devices by maintaining a virtual mapping to the physical addresses of data that comprise those memory devices (e.g., 238, 312, 408) or persistent storage devices (e.g., 236, 310, 406).

In one or more embodiments of the invention, several SOVs may concurrently exist, each of which is independently mapped to part of, one, or several memory devices. Alternatively, in one embodiment of the invention, there may only be a SOV associated with the physical regions of all devices in a given node (e.g., a client application node, a metadata node, or a storage node).

In one embodiment of the invention, a SOV may be uniquely associated with a single storage device (e.g., a memory device or a persistent storage device). Accordingly, a single SOV may provide a one-to-one virtual emulation of a single storage device of the hardware layer. Alternatively, in one or more embodiments of the invention, a single SOV may be associated with multiple storage devices (e.g., a memory device or a persistent storage device), each sharing some characteristic. For example, there may be a single SOV for two or more DRAM devices and a second memory pool for two or more PMEM devices. One of ordinary skill in the art, having the benefit of this detailed description, would appreciate that SOV(s) (e.g., 620) may be organized by any suitable characteristic of the underlying memory (e.g., based on individual size, collective size, type, speed, etc.).

In one embodiment of the invention, storage pool (632) includes one or more storage devices (e.g., memory devices and/or persistent storage devices) (located on one or more storage nodes). The storage devices (or portions thereof) may be mapped into the SOV in "slice" units (or "slices"). For example, each slice (e.g., 622, 624, 626, 628, 630) may have a size of 256 MB (the invention is not limited to this example). When mapped into the SOV, each slice may include a contiguous set of FSBs that have an aggregate size equal to the size of the slice. Accordingly, each of the aforementioned FSBs (e.g., 616, 618) is logically associated with a slice (e.g., 622, 624, 626, 628, 630) in the SOV. The portion of the slice that is mapped to a given FSB may be specified using by an offset within a SOV (or by an offset within a slice within the SOV). Each portion of the slice within a SOV is mapped to one or more physical locations in the storage pool. In one non-limiting example, the portion of slice C (626) may be 4K in size and may be stored in the storage pool (632) as a 6K stripe with four 1K data chunks (e.g., chunk w (634), chunk x (636), chunk y (638), chunk z (640)) and two 1K parity chunks (e.g., chunk P (642), chunk Q (642)). In one embodiment of the invention, slices that only include FSBs from the metadata portion are referred to as metadata slices and slices that only include FSBs from the data portion are referred to as data slices.

Using the relationships shown in FIGS. 6A-6B, a logical block (e.g., logical block A, logical block B, logical block C) in a file layout (602) (which may be specified as a [file, offset, length]) is mapped to an FSB (e.g., 616, 618), the FSB (e.g., 616, 618) is mapped to a location in the SOV (620) (which may be specified as a [SOV, offset, length]), and the location in the SOV (620) is ultimately mapped to one or more physical locations (e.g., 634, 636, 638, 640, 642, 644) in a storage media (e.g., memory devices) within a storage pool (632).

Using the aforementioned architecture, the available storage media in the storage pool may increase or decrease in size (as needed) without impacting how the application (e.g., 212) is interacting with the sparse virtual space (610). More specifically, by creating a layer of abstraction between the sparse virtual space (610) and the storage pool (632) using the SOV (620), the sparse virtual space (610) continues to provide FSBs to the applications provided that these FSBs are mapped to a SOV without having to manage the mappings to the underlying storage pool. Further, by utilizing the SOV (620), changes made to the storage pool including how data is protected in the storage pool are performed in a manner that is transparent to the sparse virtual space (610). This enables the size of the storage pool to scale to an arbitrary size (up to the size limit of the sparse virtual space) without modifying the operation of the sparse virtual space (610).

Figure 7A:
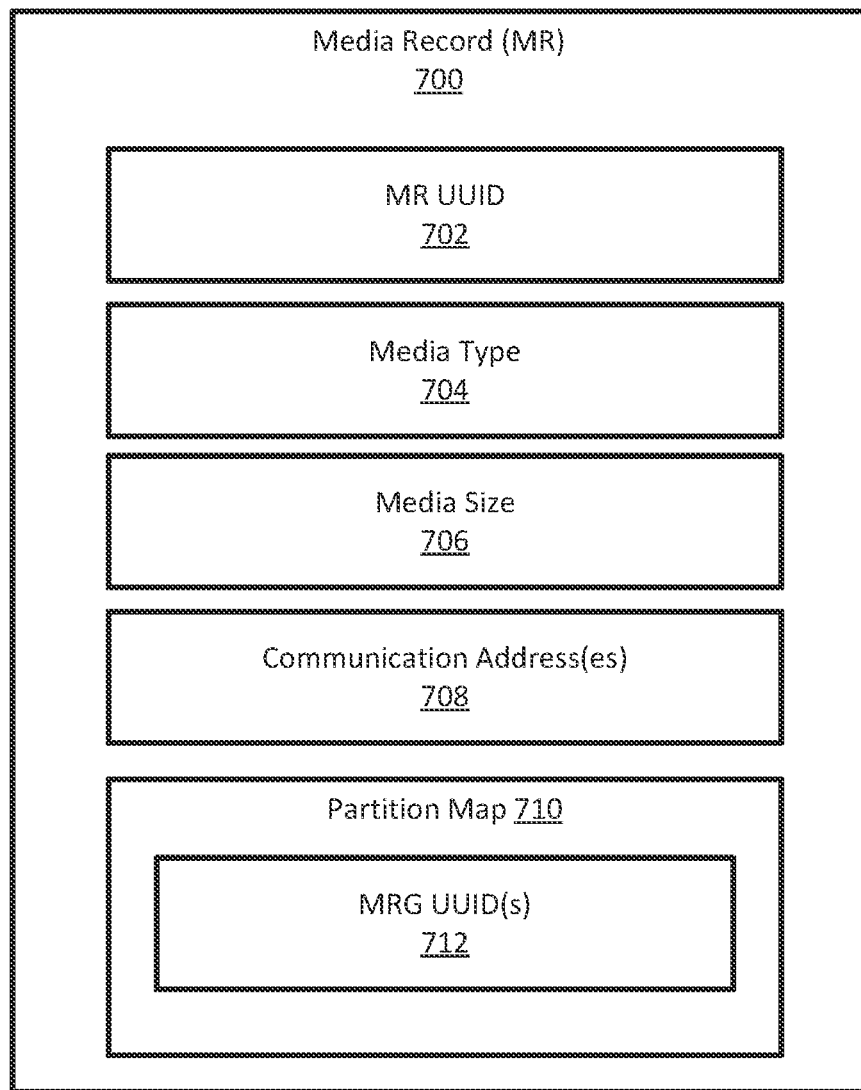
FIG. 7A shows a media record in accordance with one or more embodiments of the invention.
Figure 7B:
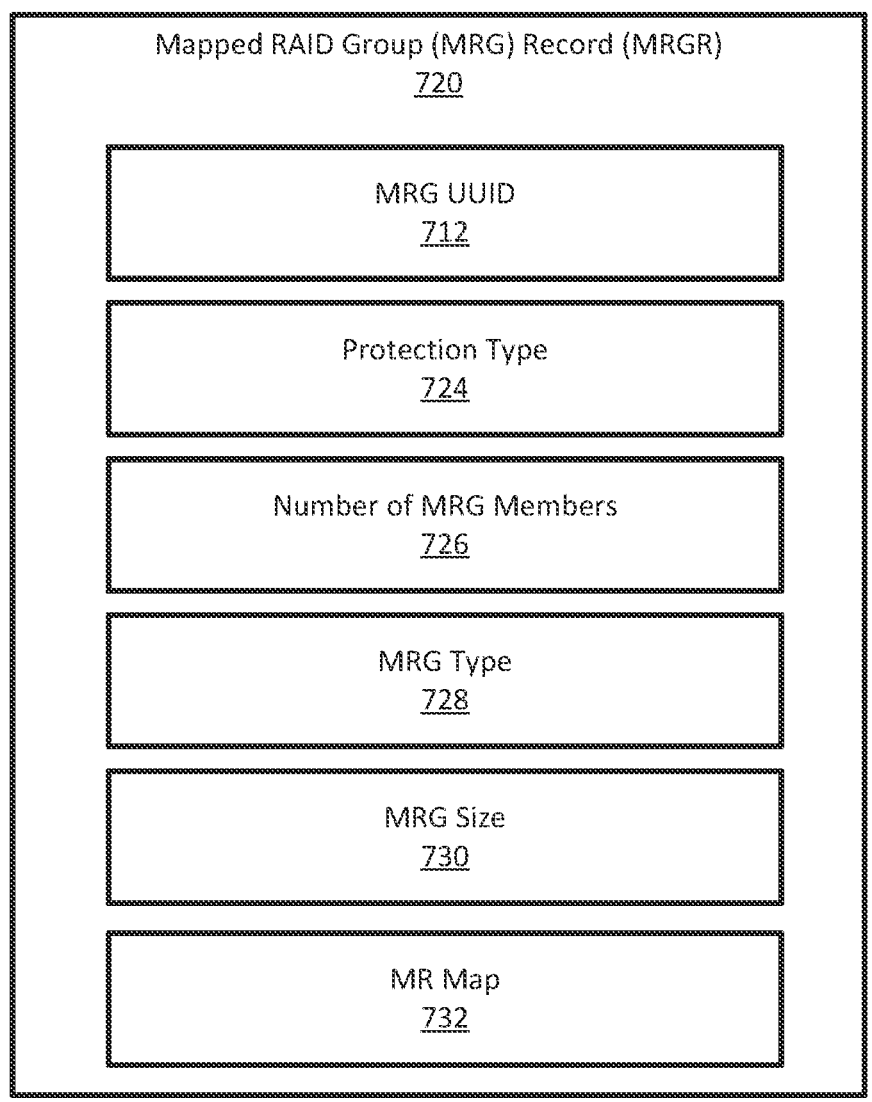
FIG. 7B shows a mapped RAID group record in accordance with one or more embodiments of the invention.
Figure 7C:
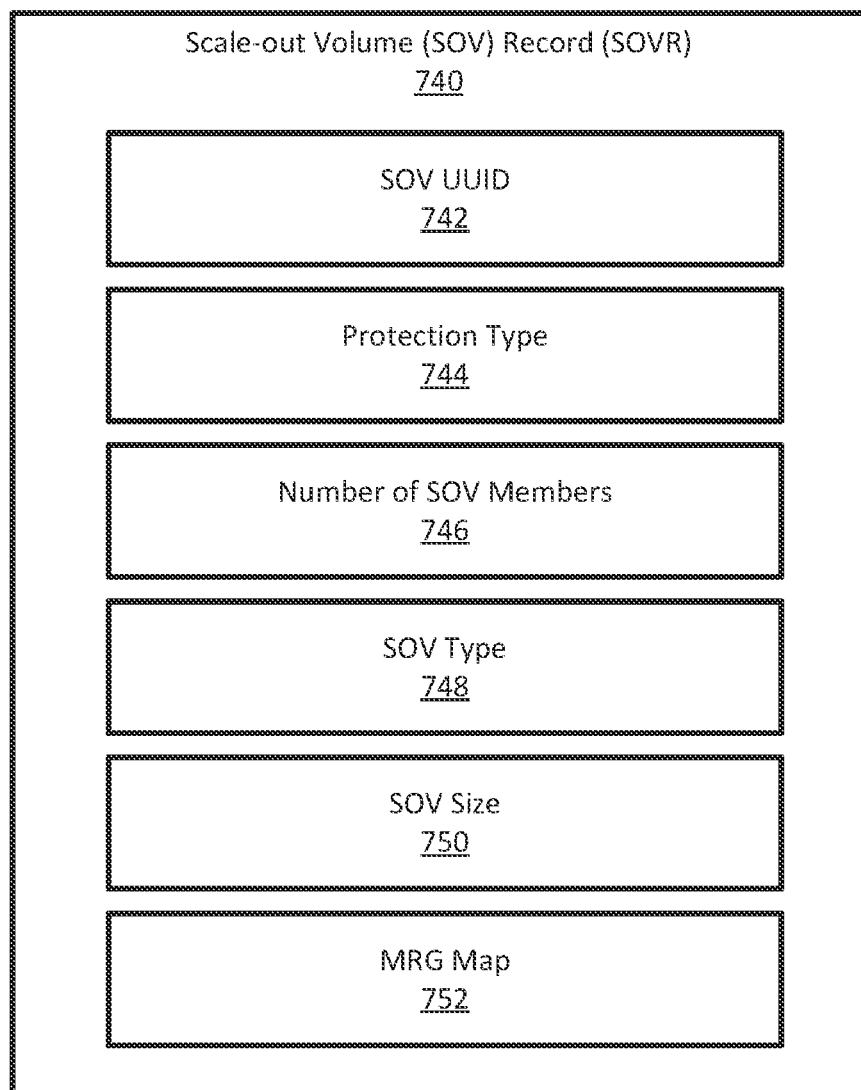
FIG. 7C shows a scale-out volume record in accordance with one or more embodiments of the invention.

In one embodiment of the invention, the aforementioned mappings are derived from the data structures shown in FIGS. 7A-7C. These data structures collectively enabling the mapping of [SOV, offset] to physical locations in the storage pool. The following data structures are stored and updated by the cluster manager on the management node; however, as discussed below copies of the data structures may be distributed to other nodes in the CSI.

FIG. 7A shows a media record (MR) in accordance with one or more embodiments of the invention. Each storage device (e.g., a memory device or a persistent storage device) includes storage media. Each storage device (or portion thereof) may be specified using its own MR. Each MR (700) may include, but is not limited to, (i) an MR universally unique identifier (UUID) (702) that uniquely identifies the MR; (ii) a media type (704), which specifies particular type of media (e.g., PMEM, computational storage, optical storage, magnetic storage, solid-state memory, etc.) of the storage device (or portion thereof), (iii) MR size (706), which specifies the storage size of the storage device (or portion thereof) (i.e., how much data and/or metadata can be stored on the storage device (or portion thereof); (iv) one or more communication addresses (708), which correspond to an address (or other information) that the client application nodes, the metadata nodes, and/or management nodes may use to communicate with the storage device (including sending I/O requests to the storage device) (a non-limiting example of a communication address is an Internet Protocol (IP) address); and (v) a partition map (710), which specifies how the storage device (or portion thereof) is partitioned, where for each partition, the MR specifies the offset and length of the partition within the storage device along with to which mapped Redundant Array of Independent Disks (RAID) group (if any) the partition belongs. If the partition is associated with an MRG, then the partition map also includes the MRG UUID (712) (described in FIG. 7B). Additional details about MRGs is provided below. The MR (700) for a given storage device (or portion thereof) may include additional and/or different information without departing from the invention.

FIG. 7B shows a mapped RAID group record (MRGR) in accordance with one or more embodiments of the invention. The storage devices (or portions thereof) that are specified using the MRs (see FIG. 7A) may be combined into MRGs. The MRGs include sets of storage devices (or portions thereof), where each member in a MRG is in its own independent fault domain. Thus, MRGs provide a mechanism to transparently support data protection for all data and metadata stored in the storage pool.

Each MRG is defined using its own MRGR. Each MRGR (720) may include, but is not limited to, (i) an MRG universally unique identifier (UUID) (712) that uniquely identifies the MRG; (ii) a protection type (724), which specifies the type of data protection to be implemented using the members of the MRG (e.g., RAID-5, RAID-6, etc.), (iii) the number of members in the MRG (726), which specifies how may storage devices (or portions thereof) are members of the MRG, (iv) a MRG type (728), which specifies the particular type of media (e.g., PMEM, computational storage, optical storage, magnetic storage, solid-state memory, etc.) of MRG (which corresponds to the media type of the members of the MRG), (v) MRG size (730), which specifies the aggregate storage size of all of the members of the MRG; and (vi) a MR map (732), which includes the MR UUID for each member of the MRG along with the offset and length of the storage device (or portion thereof) specified in the MR. The MRGR (720) may include additional and/or different information without departing from the invention. Though not shown in FIG. 7B the MRGR may also specify whether it has been allocated to a SOV (see e.g., FIG. 8C).

FIG. 7C shows a scale out volume record (SOVR) in accordance with one or more embodiments of the invention. Individual MRGs may be associated with a SOV (620). Said another way, the SOV is a virtual data space and the storage media that backs this virtual data space corresponds to the storage devices (or portions thereof) of the associated MRGs. In one embodiment of the invention, the size of the SOV corresponds to the aggregate size of the MRGs associated with the SOV; however, there may scenarios in which the size of the SOV is larger than the aggregate size of the MRGs.

Each SOV is defined using its own SOVR. Each SOVR (740) may include, but is not limited to, (i) an SOV universally unique identifier (UUID) (722) that uniquely identifies the SOV; (ii) a protection type (744), which specifies the type of data protection to be implemented by the members of the SOV (e.g., RAID-5, RAID-6, etc.), (iii) the number of members in the SOV (746), which specifies how may MRGs are members of the SOV, (iv) a SOV type (748), which specifies the particular type of media (e.g., PMEM, computational storage, optical storage, magnetic storage, solid-state memory, etc.) of SOV (which corresponds to the media type of the members of the SOV), (v) SOV size (750), which at least initially specifies the aggregate storage size of all of the members of the SOV; and (vi) a MRG map (752), which includes the MRG UUID for each member of the SOV. The SOVR (740) may include additional and/or different information without departing from the invention. Though not shown in FIG. 7C the SOV may also specify whether it has been allocated to file system (see e.g., FIG. 8C).

Figure 8A:
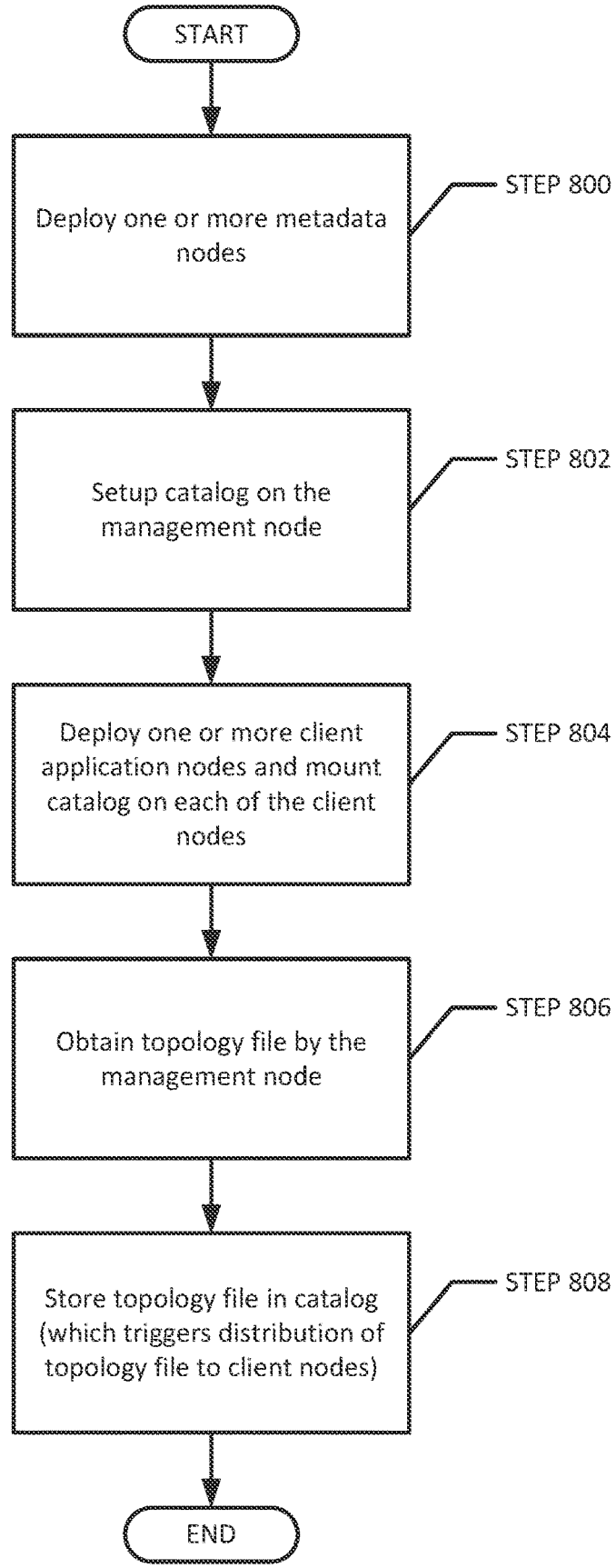
FIG. 8A shows a method for topology file distribution in accordance with one or more embodiments of the invention.

FIG. 8A shows a method for topology file distribution in accordance with one or more embodiments of the invention. While the various steps in this flowchart are presented and described sequentially, one of ordinary skill in the relevant art will appreciate that some or all of the steps may be executed in different orders, may be combined or omitted, and some or all steps may be executed in parallel.

In step 800, one or more metadata nodes are deployed. The deployment of the metadata nodes may be initiated by, e.g., an administrator. Deploying the metadata node include installing the software that is required to perform one or more of the steps described in FIGS. 8A-10.

In step 802, the cluster manger creates a file system, referred to as a catalog, and mounts the catalog. The catalog is configured such that it will be visible and/or accessible to client applications nodes.

In step 804, one or more client application nodes are deployed. The deployment of the client application nodes may be initiated by, e.g., an administrator. Once the client application nodes are deployed, the cluster manager exports the catalog to all of the client application nodes. The exporting of the catalog enables the client application nodes to mount the catalog. In this manner, whenever there is content stored in the catalog on the management node, the stored content becomes available to the client application nodes that have mounted the catalog. The catalog is not accessible to all portions of the client application node; rather, the catalog is only accessible to the client FS container.

In step 806, the management node obtains the topology file. The topology file includes the contents in the set of MR records (excluding the partition map (710)) corresponding to the storage devices (or portions thereof) in the storage pool. The management node may include functionality to discover the storage devices (or portions thereof) and generate the MR records. Additionally, or alternatively, the management node may receive the topology file from another process or service. The catalog maintains a single topology file (which may be updated, as discussed below). By maintaining a single topology file all client application nodes have the same view of the storage devices in the storage pool.

In step 808, the management node stores the topology file in the catalog. In response to the storing the topology file is distributed to all client application nodes that have mounted the catalog. Upon receipt of the topology file, the client application node stores the topology file in a location that is not accessible to the application container. Further, the client application node (or, more specifically, the memory hypervisor module) may process the MRs in the topology file and attempt to establish direct connections to the various storage devices (or portions thereof) specified in the MRs.

If the topology of the storage pool changes, then one or more MRs may be added, removed, and modified. An updated topology file may then be created that includes the additional and/or modified MRs and removes the deleted MRs. The updated topology file may also include MRs for which there has been no change. The updated topology file may then be stored in the catalog, which results in its subsequent distribution and processing as described above. In this manner, the client application nodes have real-time or near-time information about changes to the topology of the storage devices. This enables the client application nodes to efficiently update their configurations in response to changes in the topology of the storage pool. For example, when there is change to the topology file the client application node may update the mapping between SOV and storage devices (See e.g., FIG. 8D, step 876). The updated mapping may then be used to generate and issue I/O requests to the appropriate storage devices (as reflected in the updated topology file) (see e.g., FIG. 10, Step 1006). Because of the manner in which the topology files are propagated, any updates to the topology file are made in a manner that is transparent to the application container.

Figure 8B:
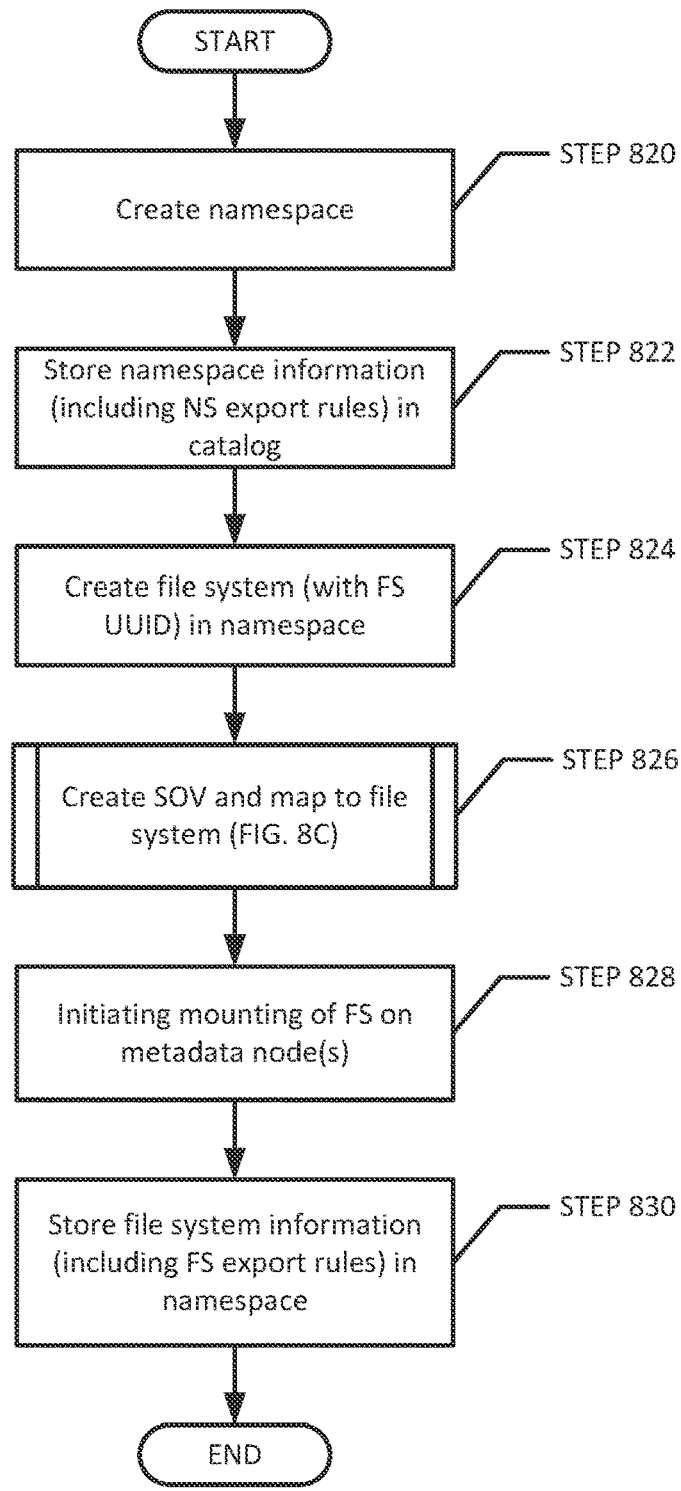
FIGS. 8B-8C show a method for file system information distribution in accordance with one or more embodiments of the invention.
Figure 8C:
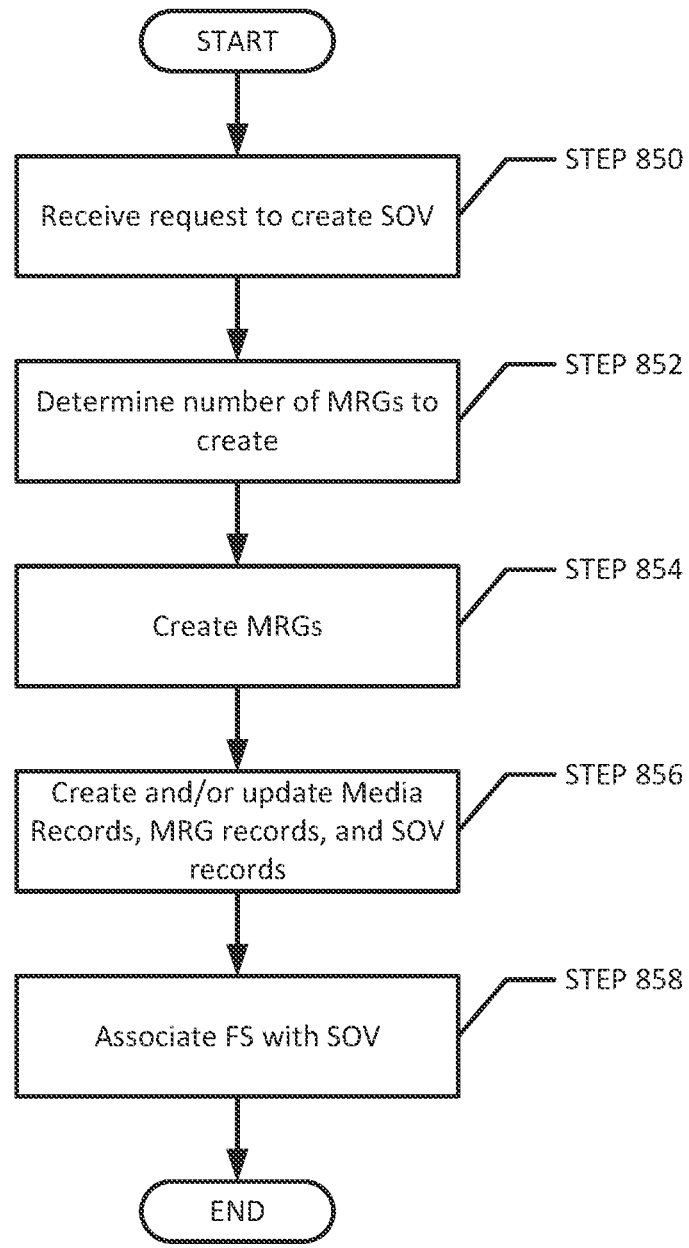

FIGS. 8B-8C show a method for file system information distribution in accordance with one or more embodiments of the invention. More specifically, FIGS. 8B and 8C describe embodiments for creating file systems and making such file systems available for applications to use where such applications are executing on client application nodes within application containers.

All or a portion of the method shown in FIGS. 8B-8C may be performed by the management node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 820, the cluster manager creates a namespace. The namespace corresponds to a data structure(s) that is used to manage information related to one or more file systems. The namespace may be created in response to a user (e.g., an administrator) issuing a command to the cluster manager to create a namespace. Creating the namespace may include associating the namespace with a unique name and mounting the namespace on a metadata node. At this stage, the namespace does not include any other information.

In step 822, the namespace information corresponding to the namespace is then stored in the catalog. The namespace information may include, but is not limited to, the unique name of the namespace and the metadata node on which the namespace is mounted. The namespace information may also include or be associated with one or more export rules. The export rules specific which client application nodes may access the namespace information. Said another way, the export rules specify whether the namespace information is visible to a given client application node. The export rules may be specified at any level of granularity without departing from the invention. In response to storing the namespace information, the namespace information is distributed (or otherwise made available) to all client application nodes that satisfy the export rules. If a given client application node does not satisfy the export rules, then the client application node is not able to mount the namespace or any file system located therein.

In step 824, the cluster manager creates a file system and associates the file system with the namespace that was created in step 820. The file system may be created in response to a user (e.g., an administrator) issuing a command to the cluster manager to create a file system. Creating the file system may include associating the file system with a unique name (e.g., an FS UUID) and then storing the information within the namespace. In addition, creating the file system may include specifying, e.g., the size of the file system and, optionally, the type of storage media. In addition, file system may be associated with one or more export rules. The export rules specify which client application nodes may access the file system. Said another way, the export rules specify whether the file system information (discussed below) is visible to a given client application node. The export rules may be specified at any level of granularity without departing from the invention. If a given client application node does not satisfy the export rules, then the client application node is not able to "see" the file system and thus not able to mount the file system.

While the file system is created in step 824, at this stage there is no storage media associated with the file system.

In step 826, one or more SOVs are created, where the aggregate size of the created SOVs corresponds to the aforementioned requested size of the file system. Further, if the creation of the file system also specifies a type of storage media, then the SOVs that are ultimately associated with storage devices (or portions thereof) are of the requested type of storage media. At the end of step 826, one or more SOVs are associated with the file system. Additional details about FIG. 8B, step 826 is provided in FIG. 8C. Various embodiments may create and/or allocate more than one SOV per file system in order to utilize multiple kinds of storage media in the file system (media with different characteristics such as faster, slower, etc.). Each SOV provides media of a given type to the file system.

In step 828, the cluster manager initiates the mounting of the file system on a metadata node, which may the same metadata node or a different metadata node than the metadata node on which the namespace is mounted (see e.g. FIG. 3, 304). The mounted file system includes a set of file system blocks (FSBs) allocated from the sparse virtual space (see e.g., FIG. 6B). These FSBs are mapped to slices (e.g., 622, 624, 626, 628, 630) in the SOV, where the slices are portions of the MRGs that makeup the SOV. The metadata node may include a copy of the corresponding SOVRs and MRGRs, which it uses to ultimately map the FSBs to slices within the SOV. In one embodiment of the invention, as part of step 828, a second metadata node is identified and a copy of the SOVR and MRGRs are stored on the second metadata node. This second metadata node may be designated as a backup metadata node such that the file system may fail over to this backup metadata node in the event that the metadata node on which the file system is initially mounted fails. Because the backup metadata node includes the SOVR and the MRGRs it has sufficient information to access the portions of the storage pool that include the metadata for the file system and then mount the file system in the event that the metadata node on which the file system is initially mounted fails.

At this stage, the file system is ready to be exported to one or more client application nodes, which may subsequently mount the file system (see e.g., FIG. 8D).

In step 830, file system information is stored in the namespace. The file system information includes, e.g., FS UUID and specifies the metadata node on which the file system is mounted. In response to storing the file system information, the file system information is distributed (or otherwise made available) to all client application nodes that have mounted the namespace and that satisfy the file system export rules. By using two levels of export rules, a given application node may be able to mount a namespace but only see portions of the content of the namespace (i.e., only certain file system information).

Turning to FIG. 8C, as discussed above, the file system is mapped to one or more SOVs in step 826. In one embodiment of the invention, the SOV(s) is created in response to file system creation in step 824.

In step 850, the cluster manager receives a request to create an SOV with the size and type of storage media specified in step 824. This request may be triggered by the creation of the file system.

In step 852, based on the size of the file system, the number of MRGs required to satisfy size requirement is determined. In one embodiment of the invention, the cluster manager specifies a standard size of each MRG. In such scenarios, the size of the file system may be a multiple of the standard size of each MRG.

In step 854, the cluster manager uses the MR to create the number of MRGs of the type of storage media (if a storage media type is specified). The result of step 854 is a set of MRGRs, which are stored on the management node.

In step 856, the MRs and the SOVR(s) are created and/or updated in response to the creation of the MRGs in step 854. More specifically, the corresponding MRs are updated to reflect to which MRG they are associated and the SOVR(s) is created, where the SOVR(s) specifies the MRGs that are associated with the SOVR(s). All of the records created and/or updated in step 856 are stored in the management node.

In step 858, the FS is associated with the SOV (i.e., the SOV defined by the SOVR). As discussed above, once the association is made, the process proceeds to step 828.

As discussed above, FIG. 8C describes one embodiment for allocating MRGs to SOVs and ultimately SOVs to a file system. The following describes another embodiment for allocating SOVs to file systems. In this second embodiment of the invention, there is only one MRG is initially mapped to each SOV. For a file system with more than one SOV, each SOV may have different numbers of MRGs (added during the file system's life cycle) and therefore each SOV may be of a different size.

The initial allocation of a SOV to a file system may be an SOV with one MRG (or a standard minimum allocation of MRGs) regardless of the specified size (or requested size) of the file system. For example, if the file system is 500 GB and the standard minimum allocation is one MRG of size 1 TB, then the file system would be allocated one MRG. In another example if the file system is 1.5 TB and the standard minimum allocation is one MRG of size 1 TB, then the file system would be allocated one MRG. As additional storage capacity is required, additional MRGs may be allocated to SOVs. Thus, in this embodiment, the SOVs may be considered to be allocated statically to a file system; however, MRGs may be dynamically allocated to SOVs over the life cycle of the file system.

Figure 8D:
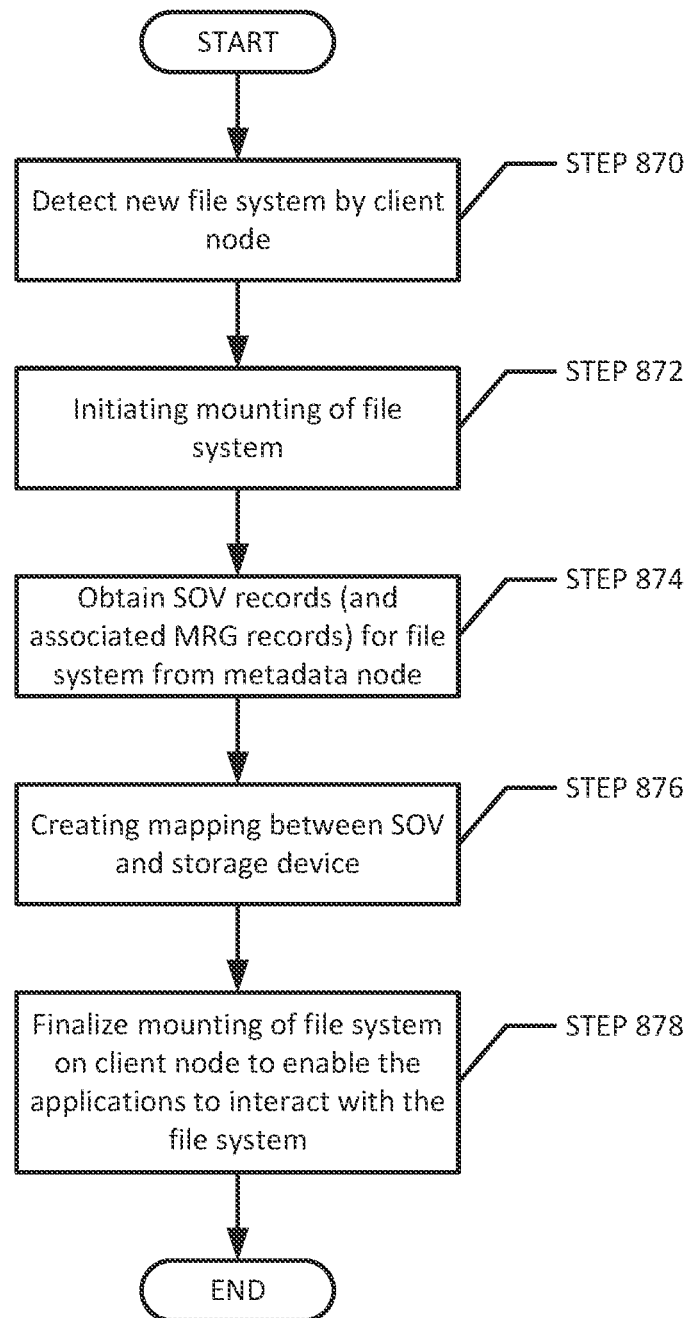
FIG. 8D show a method for file system mounting in accordance with one or more embodiments of the invention.

FIG. 8D show a method for file system mounting in accordance with one or more embodiments of the invention. All or a portion of the method shown in FIG. 8D may be performed by the client application node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 870, the client application node, which satisfies the namespace and file system export rules, detects file system information (which corresponds to a file system). More specifically, the client application node (or more specifically the FS client) may initially detect namespace information (which corresponds to a namespace) in the catalog. The client application node (or more specifically the FS client) may then mount the namespace. The mounted namespace is not accessible to the application container. Once the namespace is mounted, the client application node (or more specifically the FS client) may obtain the file system information associated with the file system (which is associated with the namespace) only if the client application node satisfies the file system export rules.

In step 872, the file system mounting is initiated in response to the detecting in step 870.

In step 874, as part of the file system mounting the SOVRs and the associated MRGRs are obtained from the metadata node on which the file system is mounted.

In step 876, the SOVRs and the MRGRs are used to generate a mapping in the FS client to enable translation between [SOV, Offset] to physical locations in the storage devices (i.e., the storage devices in the storage pool). This mapping may be maintained in the memory of the client application node. This mapping is generated using the combination of the SOVR, the MRGRs, and the MRs (which are specified in topology file).

In step 878, mounting of the file system is completed. Once the mounting of the file system is completed, the applications in the application container on the client application node may use the file system.

FIG. 9 shows a flowchart of a method of generating and servicing a mapping request in accordance with one or more embodiments of the invention. All or a portion of the method shown in FIG. 9 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 9 may be performed whenever an application (212) in a client application container (e.g., 202) triggers a page fault. In one embodiment of the invention, a page fault is issued by a processor when an invalid reference is provided to an MMU. Specifically, when a request (initiated by the application) to access or modify memory is sent to the MMU, using a virtual address, the MMU may perform a lookup in a TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

A page fault typically specifies the virtual address (i.e., an address in virtual address space (e.g. 220)). The page fault may specify other information depending on whether the page fault was triggered by a read, write, or mapping request.

In one or more embodiments of the invention, as described in FIG. 2A above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects that the OS received a page fault, and instead forwards the page fault to a different location (i.e., the client FS container) instead of the default recipient (i.e., the application container and/or application). In one embodiment of the invention, the kernel module specifically monitors for and detects exception handling processes that specify an application's inability to access the physical location of data.

Turning to FIG. 9, in step 900, the client FS container receives a request from a kernel module to resolve a page fault, where the request specifies at least one [file, offset] corresponding to the virtual address from the virtual address space of the application. Said another way, the virtual address associated with the page fault is translated into a [file, offset]. The [file, offset] is then sent to the client FS container. The "file" in the [file, offset] corresponds to a file that is in a file system that was previously mounted by the client application node (see e.g., FIG. 8D).

In step 902, the FS container sends a request to a metadata node to obtain a data layout associated with the [file, offset] (i.e., the metadata node on which the file system is mounted). The request for the data layout may also specify that the request is for read only access or for read write access. In one embodiment of the invention, read only access indicates that the application only wants to read data from a physical location associated with the virtual address while read write access indicates that the application wants to read data from and/or write data to a physical location associated with the virtual address. From the perspective of the application, the physical location is a local physical location (i.e., a physical location in the memory or the persistent storage) on the client application node; however, as shown in FIGS. 6A-6B, the physical location is actually a physical location in the storage pool.

In one embodiment of the invention, each FS client (e.g., 240) is associated with one or more file systems (e.g., 304) (and each file system may be associated with multiple FS clients). The request in step 902 is sent to the metadata node that hosts the file system that is associated with the FS client on the client application node (i.e., the client application node on which the page fault was generated).

In step 904, the metadata node receives the request from the FS client container.

In step 906, in response to the request, the metadata server (on the metadata node) identifies one or more FSBs in the sparse virtual space. The identified FSBs correspond to FSBs that are allocatable. An FSB is deemed allocatable if: (i) the FSB is mapped to the SOV (i.e., the SOV that is associated with the file system, see e.g. FIG. 8B) and (ii) the FSB has not already been allocated. Condition (i) is required because while the sparse virtual space includes a large collection of FSBs, by design, at any given time not all of these FSBs are necessarily associated with any SOV(s). Accordingly, only FSBs that are associated with a SOV at the time step 906 is perform may be allocated. Condition (ii) is required as the sparse virtual space is designed to support applications distributed across multiple clients and, as such, one or more FSBs that are available for allocation may have been previously allocated by another application. The FSBs identified in step 906 may be denoted a pre-allocated FSBs in the event that no application has not written any data to these FSBs.

In one embodiment of the invention, the FSBs identified in step 906 may not be sequential (or contiguous) FSBs in the sparse virtual space. In one or more embodiments of the invention, more than one FSB may be allocated (or pre-allocated) for each logical block. For example, consider a scenario in which each logical block is 8K and each FSB is 4K. In this scenario, two FSBs are allocated (or pre-allocated) for each logical block. The FSBs that are associated with the same logical block may be sequential (or contiguous) FSBs within the sparse virtual space.

In step 908, after the FSB(s) has been allocated (or pre-allocated as the case may be), the metadata server generates a data layout. The data layout provides a mapping between the [file, file offset] (which was included in the request received in step 900) and a [SOV, offset]. The data layout may include one or more of the aforementioned mappings between [file, file offset] and [SOV, offset]. Further, the data layout may also specify the one or more FSBs associated with the data layout.

In one embodiment of the invention, if the request in step 902 specifies read only access, then the data layout will include [file, file offset] to [SOV, offset] mappings for the FSBs that include the data that the application (in the client application node) is attempting to read. In one embodiment of the invention, if the request in step 902 specifies read write access, then then the data layout may include one set of [file, file offset] to [SOV, offset] mappings for the FSBs that include the data that the application (in the client application node) is attempting to read and a second set of [file, file offset] to [SOV, offset] mappings for the FSBs to which the application may write data. The dual set of mappings provided in the aforementioned data layout may be used to support redirected writes, i.e., the application does not overwrite data; rather, all new writes are directed to new FSBs.

Continuing with the discussion of FIG. 9, in step 910, the data layout is sent to the FS client container. The metadata server may track which client application nodes have requested which data layouts. Further, if the request received in step 900 specified read write access, the metadata server may prevent any other client application from accessing the FSBs associated with the data layout generated in Step 908.

In step 912, the client application node receives and caches the data layout from the metadata node. The FS client may also create an association between the logical blocks in the file layout (e.g., 602) and the corresponding FSBs in the file system layout (e.g., 604) based on the data layout.

In one embodiment of the invention, the FS client allocates an appropriate amount of local memory (e.g., local DRAM, local PMEM), which is/will be used to temporarily store data prior to it being committed to (i.e., stored in) the storage pool using the received data layout. Further, if the request that triggered the page fault (see step 900) was a read request, then the FS client may further initiate the reading of the requested data from the appropriate location(s) in the storage pool (e.g., via the memory hypervisor module) and store the obtained data in the aforementioned local memory.

In step 914, the client FS container informs the OS (or kernel module in the OS) of the virtual-to-physical address mapping. The virtual-to-physical address mapping is a mapping of a location in the virtual address space and a physical address in the local memory (as allocated in step 912). Once the aforementioned mapping is provided, the application and/or OS may directly manipulate the local memory of the client application node (i.e., without processing from the client FS container).

In one embodiment of the invention, if the MRGs associated with the SOVR change then the updated MRGs and SOVR are provided to the appropriate metadata nodes. Further, if the aforementioned changes also result in a changes to the topology file, then an updated topology file is distributed as discussed above. In response to a change in the SOV and/or the MRGs associated with the SOVR, the impacted data layouts may be invalidated by the metadata node on which the corresponding file system (i.e., the file system associated with the SOVR) is mounted. The result of the invalidation is that the client application nodes are forced to obtain new data layouts from the metadata server (see e.g. FIG. 9) when they attempt to perform I/O requests. When this occurs, the metadata server not only sends back the data layout but also sends the updated SOVR and MRGs such that the client application node has sufficient information to translate the data layout (i.e., [SOV, offset]) to the appropriate physical locations in the storage pool (which are now defined by the updated SOV and/or MRGs).

Figure 10:
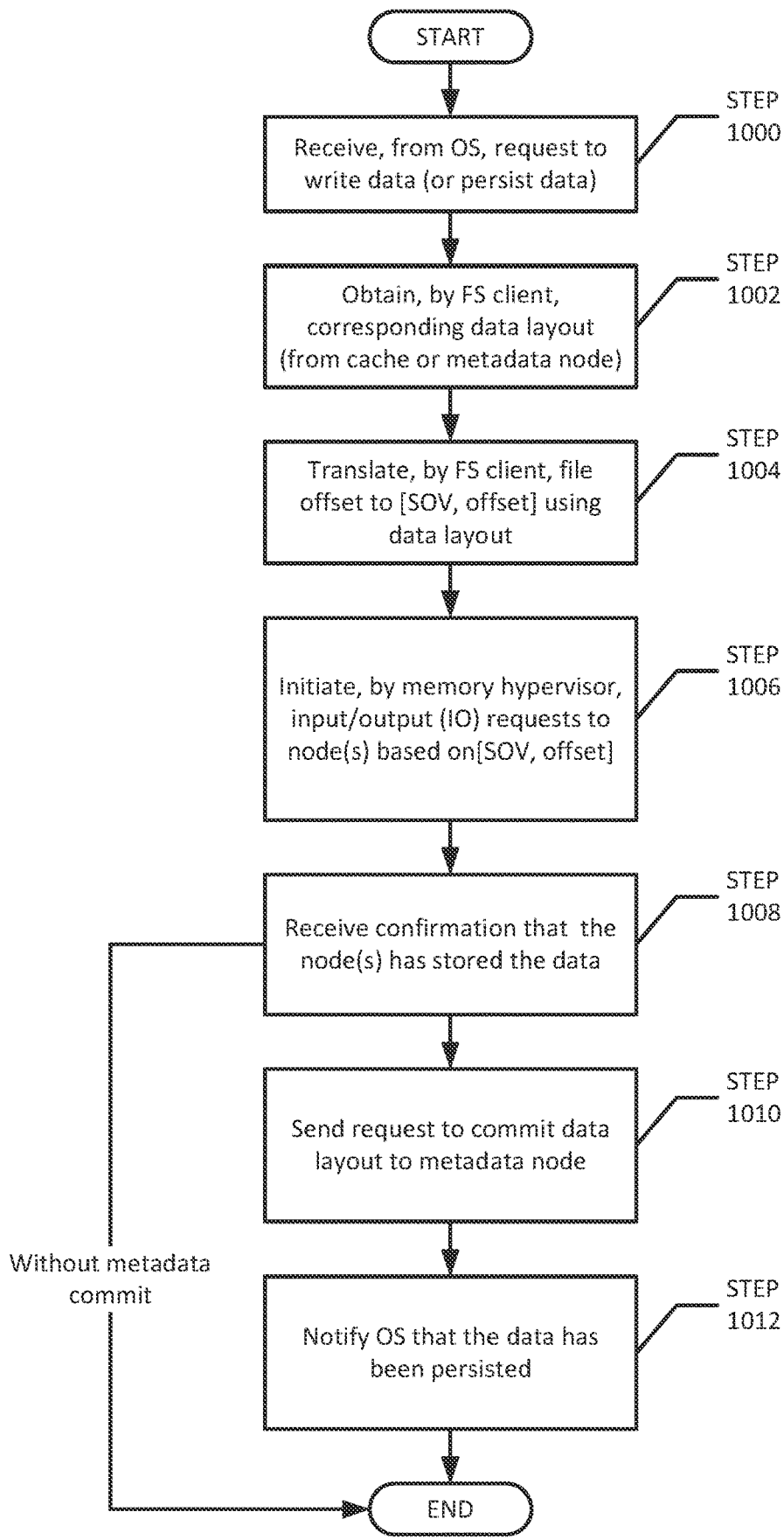
FIG. 10 shows a flowchart of a method of servicing a write request in accordance with one or more embodiments of the invention.

FIG. 10 shows a flowchart of a method of servicing a write request in accordance with one or more embodiments of the invention. All or a portion of the method shown in FIG. 10 may be performed by the client application node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 10 may be performed whenever an application in the application (e.g., 212) wants to write data. More specifically, once the method shown in FIG. 6 has been performed, the application may directly read and write data to the local memory of a client application node, which is then written via steps 1000-1008 to the storage pool. Further, for the data to be persisted the data must be stored in both the storage pool and the corresponding metadata must be stored in the metadata node (see e.g., Step 1010-1012). Steps 1000-1008, which relate to the storage of the data in the storage pool, may be initiated by the client application, the OS, or the client FS container. The client application may initiate the storage of the data as part of an msync or fflush command; while the OS and client FS container may initiate the storage of the data as part of its management of the local resources on the client application node.

If the application has initiated the storage of the data using a msync or fflush command, then steps 1000-1012 are performed, resulting the data being persisted. In this scenario, the data is written to storage as a first part of processing the msync or fflush command, and then the metadata (including the data layout) is stored on the metadata server as the second part of processing the msync or fflush command.

However, if the OS or client FS container initiates the storage of the data, then the corresponding metadata may or may not be committed (i.e., steps 1010 and 1012 may not be performed). In certain scenarios, steps 1010-1012 may be initiated by the OS or the client FS container and performed by the client FS container as part of the OS or client FS container managing the local resources (e.g., portions of the cache used to store the data layouts needs to be freed to store other data layouts).

In step 1000, a request to write data (i.e., write data to the storage pool; however, the metadata may or may not be committed, see e.g., Step 1010) is received by the client FS container from the OS. The request may specify a [file, offset]. Regardless of the semantics that the application is utilizing, the OS translates (as necessary) the portion of the virtual address space referenced by the application in its request to write data into a corresponding [file, offset]. As discussed above the writing of data may also be initiated by the OS and/or the client FS container without departing from the invention. In such embodiments, the request is initiated by the OS and/or another process in the client FS container and the process that initiated the request provides the [file, offset] to the FS client.

In step 1002, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 1004, the FS client, using the data layout, obtains the SOV offset. As discussed above, the data layout provides a mapping between file offsets (e.g., offsets within a file layout (e.g., 602)) and the [SOV, offset] s in a SOV (e.g., 620). Accordingly, the FS client translates the [file, offset] into [SOV, offset].

In step 1006, the [SOV, offset] is then provided to the memory hypervisor module to process. More specifically, the memory hypervisor module includes the information necessary to generate and issue one or more I/O requests that result in the data being written directly from the client application node (e.g., via a communication interface(s)) to an appropriate location in storage pool. For example, if the application is attempting to write data associated with logical block A (e.g., [File A, offset 0], then the memory hypervisor module is provided with [SOV, offset 18] (which is determined using the obtained data layout). The memory hypervisor module includes the necessary information (e.g., the MRs and MRGRs) to enable it to generate, in this example, one or more I/O requests to specific locations in the storage pool. Said another way, the memory hypervisor module includes functionality to: (i) determine how many I/O requests to generate to store the data associated with [SOV, offset 18]; (ii) divide the data into an appropriate number of chunks (i.e., one chunk per I/O request); (iii) determine the target of each I/O request (the physical location in the storage pool at which the chunk will be stored); and (iv) issue the I/O requests directly to the nodes on which the aforementioned physical locations exist. The issuance of the I/O requests includes initiating the transfer of data from the appropriate location in the local memory to the target location specified in the I/O request.

The communication interface(s) in the client application node facilitates the direct transfer of the data from the client application node to the appropriate location in the storage pool. As discussed above, the storage pool may include storage media located in storage devices (e.g., memory devices or persistent storage devices) that may be on client application nodes, metadata nodes, and/or storages. Accordingly, for any given I/O request, the communication interface(s) on the client application node on which the data resides transmits the data directly to communication interface(s) of the target node (i.e., the node that includes the storage media on which the data is to be written).

In step 1008, the client application node awaits for confirmation from the target node(s) that the I/O request(s) generated and issued in step 1006 has been successfully stored on the target node(s). At the end of step 1008, the data has been written to the storage pool; however, the corresponding metadata is not persisted at this point; as such, the data is not deemed to be persisted. Specifically, if the application does not subsequently issue an msync command (e.g., when the application is using memory semantics) or an fflush command (e.g., when the application is using file semantics) the data will be stored in the storage pool but the metadata server will not be aware that such data has been stored. In order to persist the data, steps 1010 and 1012 are performed. If steps 1000-1008 were initiated by the OS or the client FS container, then the process may end at step 1008 as the data was only written to the storage pool to free local resources (e.g., memory) on the client application node and there is no need at this time to persist the data (i.e., perform steps 1010-1012). Further, in scenarios in which the OS initiated the writing of the data, then step 1008 also includes the client FS container notifying the OS that that the data has been written to the storage pool. However, as discussed below, there may be scenarios in which the data needs to be persisted at this time and, as such, steps 1010-1012 are performed.

Specifically, the data (and associated metadata) may be persisted as a result of: (i) the application issuing an msync command (e.g., when the application is using memory semantics) or an fflush command (e.g., when the application is using file semantics, (ii) the client FS container initiating (transparently to the application) steps 1010 and 1012, or (iii) the OS initiating (transparently to the application) steps 1010 and 1012.

If the application issues a request to commit data (e.g., issues an msync command or an fflush command), then in step 1010, the client application node (in response to the confirmation in step 1008) sends a request to commit the data layout to the metadata node. The commit request includes the mapping between the file layout and the file system layout (see e.g., FIG. 6A). Upon receipt of the commit request, the metadata server stores the mapping between the file layout and the file system layout. The processing of the commit request may also trigger the invalidation of prior versions of the data layout that are currently cached on other client application nodes. For example, if client application node A requested a data layout with read only access for a [file, offset] corresponding to FSB A and client application node B subsequently requested a data layout with read write access also for FSB A, then once client application node B performs the method in FIG. 10, the data layout on client application node A is invalidated (e.g., based on a command issued by the metadata server) so as to force client application node A to obtain an updated data layout, which then ensures that client application node A is reading the updated version of the data associated with FSB A. The process then proceeds to step 1012.

In scenarios in which the OS or client FS container has previously committed the data layout to the metadata node, then when the client FS container receives a request to persist the data from the application, the client FS container confirms that it has previously committed the corresponding data layout (and other related metadata) (without issuing any request to the metadata nodes). After making this determination locally, the client FS container then proceeds to step 1012.

Finally, in scenarios in which the OS or the client FS container needs to commit the corresponding metadata to the metadata server (e.g., portions of the cache used to store the data layouts needs to be freed to store other data layouts), then steps 1010 and 1012 may be initiated by the OS or the client FS container and performed by the client FS container.

In step 1012, the client FS container then notifies the OS that the data has been persisted. The OS may then send the appropriate confirmation and/or notification to the application that initiated the request to persist the data. The OS does not notify the application when FIG. 10 was initiated by the OS and/or the client FS container. Further, depending on the implementation, the client FS container may or may not notify the OS if steps 1010 and 1012 were initiated by the client FS container.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for distributing topology information to client application nodes in a distributed system, the method comprising:

creating a file system on a management node;
enabling a plurality of client application nodes to access the file system on the management node;
obtaining a topology file, wherein the topology file comprises information about a plurality of storage devices to enable the plurality of client application nodes to issue input/output (IO) requests directly to the plurality of storage devices;
storing, by the management node, the topology file in the file system, wherein the topology file is accessible to the plurality of client application nodes once the topology file is stored in the file system;
updating, by the management node, the topology file to obtain an updated topology file, wherein the updated topology file specifies a second plurality of storage devices, wherein the plurality of storage devices is not the same as the second plurality of storage devices; and
storing, by the management node, the updated topology file in the file system, wherein storing of the updated topology file triggers the plurality of client application nodes to obtain the updated topology file and to modify an individual configuration of each of the plurality of client application nodes to interact with the second plurality of storage devices based on the updated topology file.

2. The method of claim 1, wherein the topology file specifies, for a storage device of the plurality of storage devices, a media type of the storage device, a size of the storage device, and a communication address that the plurality of client application nodes uses to access the storage device.

3. The method of claim 2,
wherein a subset of the plurality of storage devices is associated with a mapped Redundant Array of Independent Disks (RAID) group (MRG),
wherein the storage device is one of the plurality of storage devices,
wherein the topology file further specifies that the storage device is part of the MRG,
wherein the plurality of client application nodes stores data on the plurality of storage devices based on the MRG.

4. The method of claim 2, wherein the communication address is an Internet Protocol (IP) address.

5. The method of claim 1, wherein the plurality of storage devices comprises a memory device.

6. The method of claim 5, wherein the memory devices is a persistent memory (PMEM) device.

7. A non-transitory computer readable medium comprising instructions which, when executed by a processor, enables the processor to perform a method, the method comprising:

creating a file system on a management node;
enabling a plurality of client application nodes to access the file system on the management node;
obtaining a topology file, wherein the topology file comprises information about a plurality of storage devices to enable the plurality of client application nodes to issue input/output (IO) requests directly to the plurality of storage devices;
storing, by the management node, the topology file in the file system, wherein the topology file is accessible to the plurality of client application nodes once the topology file is stored in the file system;
updating, by the management node, the topology file to obtain an updated topology file, wherein the updated topology file specifies a second plurality of storage devices, wherein the plurality of storage devices is not the same as the second plurality of storage devices; and storing, by the management node, the updated topology file in the file system, wherein storing of the updated topology file triggers the plurality of client application nodes to obtain the updated topology file and to modify an individual configuration of each of the plurality of client application nodes to interact with the second plurality of storage devices based on the updated topology file.

8. The non-transitory computer readable medium of claim 7, wherein the topology file specifies, for a storage device of the plurality of storage devices, a media type of the storage device, a size of the storage device, and a communication address that the plurality of client application nodes uses to access the storage device.

9. The non-transitory computer readable medium of claim 8,
wherein a subset of the plurality of storage devices is associated with a mapped Redundant Array of Independent Disks (RAID) group (MRG),
wherein the storage device is one of the plurality of storage devices,
wherein the topology file further specifies that the storage device is part of the MRG,
wherein the plurality of client application nodes stores data on the plurality of storage devices based on the MRG.

10. The non-transitory computer readable medium of claim 8, wherein the communication address is an Internet Protocol (IP) address.

11. The non-transitory computer readable medium of claim 7, wherein the plurality of storage devices comprises a memory device.

12. The non-transitory computer readable medium of claim 11, wherein the memory devices is a persistent memory (PMEM) device.

13. A management node, comprising:
memory comprising instructions;
a processor configured to execute the instructions, wherein when the instructions are executed the node performs a method, the method comprising:
creating a file system;
enabling a plurality of client application nodes to access the file system on the management node;
obtaining a topology file, wherein the topology file comprises information about a plurality of storage devices to enable the plurality of client application nodes to issue input/output (IO) requests directly to the plurality of storage devices;

storing the topology file in the file system, wherein the topology file is accessible to the plurality of client application nodes once the topology file is stored in the file system;

updating, by the management node, the topology file to obtain an updated topology file, wherein the updated topology file specifies a second plurality of storage devices, wherein the plurality of storage devices is not the same as the second plurality of storage devices; and storing, by the management node, the updated topology file in the file system, wherein storing of the updated topology file triggers the plurality of client application nodes to obtain the updated topology file and to modify an individual configuration of each of the plurality of client application nodes to interact with the second plurality of storage devices based on the updated topology file.

14. The management node of claim 13, wherein the topology file specifies, for a storage device of the plurality of storage devices, a media type of the storage device, a size of the storage device, and a communication address that the plurality of client application nodes uses to access the storage device.

15. The management node of claim 14,
wherein a subset of the plurality of storage devices is associated with a mapped Redundant Array of Independent Disks (RAID) group (MRG),
wherein the storage device is one of the plurality of storage devices,
wherein the topology file further specifies that the storage device is part of the MRG,
wherein the plurality of client application nodes stores data on the plurality of storage devices based on the MRG.

16. The management node of claim 14, wherein the communication address is an Internet Protocol (IP) address.

17. The management node of claim 13, wherein the plurality of storage devices comprises a memory device and wherein the memory devices is a persistent memory (PMEM) device.

* * * * *